(12) United States Patent
Grocutt et al.

(10) Patent No.: US 10,768,938 B2
(45) Date of Patent: Sep. 8, 2020

(54) BRANCH INSTRUCTION

(71) Applicant: ARM Limited, Cambridge (GB)

(72) Inventors: Thomas Christopher Grocutt, Cambridge (GB); Richard Roy Grisenthwaite, Cambridge (GB); Simon John Craske, Cambridge (GB); François Christopher Jacques Botman, Cambridge (GB); Bradley John Smith, Haverhill (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/085,053

(22) PCT Filed: Mar. 21, 2017

(86) PCT No.: PCT/GB2017/050774
§ 371 (c)(1),
(2) Date: Sep. 14, 2018

(87) PCT Pub. No.: WO2017/163038
PCT Pub. Date: Sep. 28, 2017

(65) Prior Publication Data
US 2019/0079770 A1    Mar. 14, 2019

(30) Foreign Application Priority Data
Mar. 23, 2016    (GB) .................................. 1604948.8

(51) Int. Cl.
*G06F 9/30* (2018.01)
*G06F 9/38* (2018.01)
(Continued)

(52) U.S. Cl.
CPC .......... *G06F 9/3806* (2013.01); *G06F 9/3005* (2013.01); *G06F 9/30054* (2013.01);
(Continued)

(58) Field of Classification Search
CPC ....................................................... G06F 9/00
See application file for complete search history.

(56) References Cited

U.S. PATENT DOCUMENTS

| | | | |
|---|---|---|---|
| 3,551,895 | A | 12/1970 | Driscoll |
| 5,742,804 | A | 4/1998 | Yeh et al. |

(Continued)

FOREIGN PATENT DOCUMENTS

| | | |
|---|---|---|
| EP | 0 553 532 | 8/1993 |
| EP | 1 071 010 | 1/2001 |

(Continued)

OTHER PUBLICATIONS

U.S. Appl. No. 16/080,736, filed Aug. 29, 2018, Inventor: Grant et al.
(Continued)

*Primary Examiner* — Cheng Yuan Tseng
(74) *Attorney, Agent, or Firm* — Nixon & Vanderhye P.C.

(57) ABSTRACT

A data processing system provides a branch forward instruction (BF) which has programmable parameters specifying a branch target address to be branched to and a branch point identifying a program instruction following the branch forward instruction which, when reached, is followed by a branch to the branch target address.

19 Claims, 24 Drawing Sheets

(51) Int. Cl.
G06F 9/32 (2018.01)
G06F 9/34 (2018.01)

(52) U.S. Cl.
CPC .......... *G06F 9/30145* (2013.01); *G06F 9/321* (2013.01); *G06F 9/322* (2013.01); *G06F 9/34* (2013.01)

(56) References Cited

U.S. PATENT DOCUMENTS

| | | | |
|---|---|---|---|
| 5,761,470 | A | 6/1998 | Yoshida |
| 6,092,188 | A | 7/2000 | Corwin et al. |
| 6,304,963 | B1 | 10/2001 | Elwood |
| 6,308,322 | B1 | 10/2001 | Serocki et al. |
| 7,272,704 | B1 | 9/2007 | Nguyen et al. |
| 7,886,134 | B2 | 2/2011 | Mizumo |
| 9,430,245 | B2 * | 8/2016 | Rijshouwer ............ G06F 9/3861 |
| 2004/0193858 | A1 | 9/2004 | Ahmad et al. |
| 2005/0066153 | A1 | 3/2005 | Sharangpani et al. |
| 2005/0132165 | A1 | 6/2005 | Ford et al. |
| 2005/0223202 | A1 | 10/2005 | Peri et al. |
| 2007/0255933 | A1 | 11/2007 | Moyer |
| 2008/0155237 | A1 | 6/2008 | Dobson et al. |
| 2010/0095097 | A1 | 4/2010 | Gschwind |
| 2010/0122066 | A1 | 5/2010 | Fischer |
| 2010/0169612 | A1 | 7/2010 | Persson |
| 2010/0325397 | A1 | 12/2010 | Craske |
| 2010/0325483 | A1 | 12/2010 | Gonion et al. |
| 2011/0280314 | A1 | 11/2011 | Sankaran |
| 2012/0166765 | A1 | 6/2012 | Gonion |
| 2012/0226894 | A1 | 9/2012 | Seki |
| 2014/0095850 | A1 | 4/2014 | Plotnikov et al. |
| 2014/0096119 | A1 | 4/2014 | Vasudevan et al. |
| 2014/0115301 | A1 | 4/2014 | Sanghai et al. |
| 2014/0189296 | A1 | 7/2014 | Ould-Ahmed-Vall |
| 2014/0189331 | A1 | 7/2014 | Lipshits |
| 2014/0208078 | A1 | 7/2014 | Bradbury |
| 2014/0229708 | A1 | 8/2014 | Muff |
| 2015/0309795 | A1 | 10/2015 | Kurd et al. |

FOREIGN PATENT DOCUMENTS

| | | |
|---|---|---|
| EP | 2 725 484 | 4/2014 |
| WO | 00/08551 | 2/2000 |
| WO | 00/22516 | 4/2000 |
| WO | 02/084451 | 10/2002 |
| WO | 2010/123370 | 10/2010 |
| WO | 2010/142987 | 12/2010 |

OTHER PUBLICATIONS

U.S. Appl. No. 16/081,464, filed Aug. 31, 2018, Inventor: Grocutt et al.
International Search Report and Written Opinion of the ISA for PCT/GB2017/050775, dated Jun. 20, 2017, 12 pages.
Search and Examination Report for GB1604946.2, dated Sep. 7, 2016, 7 pages.
Examination Report for GB1604946.2, dated May 26, 2017, 5 pages.
Examination Report for GB1604946.2, dated Oct. 6, 2017, 5 pages.
International Search Report and Written Opinion of PCT/GB2017/050776 dated Jun. 30, 2017, 14 pages.
Combined Search and Examination Report for GB1604945.4, dated Sep. 7, 2016, 8 pages.
Examination Report for GB1604945.4, dated May 26, 2017, 4 pages.
Examination Report for GB1604945.4, dated Aug. 8, 2018, 6 pages.
"A Guide to Vectorization with Intel(R) C++ Compilers", *Intel Corporation*, 2010, 20 pages.
Aaron Birkland, "Vectorisation", *Cornell University*, Dec. 11, 2012, 47 pages.
International Search Report and Written Opinion of the ISA dated Jun. 20, 2017, 11 pages.
Young et al., "Code Scheduling Methods for some architectural features in pipe" *MicroProcessing and MicroProgramming*, vol. 22, No. 1, Jan. 1, 1998, pp. 39-63.
Appelbe et al., "Hoisting Branch Conditions Improving Super-Scalar Processor Performance", *Lecture Notes in Computer Science*, Jun. 9, 2005, 15 pages.
Search Report for GB1604948.8 dated Oct. 21, 2016, 3 pages.
Examination Report for GB Application No. 1604945.4, dated Oct. 6, 2017, 4 pages.
Office Action dated Jan. 16, 2020 for U.S. Appl. No. 16/081,464, 30 pages.

* cited by examiner

```
Sum
    BF      sumReturn, lr  // Request Function Return at sumReturn
    ADD₁    r0, r0, r1
    ADD₂    r0, r0, r2 sumReturn :
    Bx      lr
```

| Data Indicative of Bx | Branch Target | x | ENC | 201 |

| Data Indicative of ADD$_2$ | Branch Target | x | ENC | 202 |

Address offset =>2*32-bit instructions
| 8 | Branch Target | x | ENC | 203 |

Instruction Count
| 2 | Branch Target | x | ENC | 204 |

1*32-bit and 1*16-bit instructions
| 6 | Branch Target | x | ENC | 205 |

Address offset 2*32-bits; LSB not used as all instruction are aligned to 2 byte boundaries
| 4 | Branch Target | x | ENC | 211 |

FIG. 2C

| | | |
|---|---|---|
| BF <r> : | <b_label>, <Rm> | 206 |
| BF <imm> : | <b_label>, <imm> | 207 |
| BFL <r> : | <b_label>, <Rm> | 208 |
| BFL <imm> : | <b_label>, <imm> | 209 |
| BF <c> : | op{cand}, <b_label>, <imm> | 210 |

FIG. 2D

|   | 0 | 1 | 2 | 3 | 4 | 5 | 6 | 7 | 8 |
|---|---|---|---|---|---|---|---|---|---|
| F | $I_1$ | BF | $ADD_1$ | $ADD_2$ | $I_{1BT}$ | $I_{2BT}$ | $I_{3BT}$ | Ret | $I_2$ |
| D |   | $I_1$ | BF | $ADD_1$ | $ADD_2$ | $I_{1BT}$ | $I_{2BT}$ | $I_{3BT}$ | Ret |
| E |   |   | $I_1$ | BF | $ADD_1$ | $ADD_2$ | $I_{1BT}$ | $I_{2BT}$ | $I_{3BT}$ |

$I_{1BT}$ = branch target instruction

```
I₁
CMP
BFCSEL EQ, BP, func, end
ADD₁
...
            ADD₂
BP:
            BEQ func        IF NE        IF EQ
end:
            I₂
            ...
func:
            I₁BT
            I₂BT
            I₃BT
```

```
I₁
CMP
BFCSEL EQ, BP, func1, end   ◄── conditional BFCSEL
BFCSEL NE, BP, func2, end   ◄── overwrites branch control
ADD₁                              cache if true
...
            ADD₂
BP:
            BEQ func1
            BNE func2
end:
            I₂
            ...
func1:
            I₁BT
            I₂BT
            I₃BT
            ...
func2:
            I₄BT
            I₅BT
            ...
```

|   | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|----|----|----|----|----|----|----|----|----|----|
|   |   | \{ 1st pass includes DLS(P) & DLE \} | | | | | | \{ zero-overhead loop \} | | | | \{ zero-overhead loop \} | | | | \{ zero-overhead loop \} | | | | |
| F | $I_x$ | DLS | $I_0$ | $I_1$ | $I_2$ | $I_3$ | DLE | $I_0$ | $I_1$ | $I_2$ | $I_3$ | $I_0$ | $I_1$ | $I_2$ | $I_3$ | $I_0$ | $I_1$ | $I_2$ | $I_3$ | |
| D |   | $I_x$ | DLS | $I_0$ | $I_1$ | $I_2$ | $I_3$ | DLE | $I_0$ | $I_1$ | $I_2$ | $I_3$ | $I_0$ | $I_1$ | $I_2$ | $I_3$ | $I_0$ | $I_1$ | $I_2$ | $I_3$ |
| E |   |   | $I_x$ | DLS | $I_0$ | $I_1$ | $I_2$ | $I_3$ | DLE | $I_0$ | $I_1$ | $I_2$ | $I_3$ | $I_0$ | $I_1$ | $I_2$ | $I_3$ | $I_0$ | $I_1$ | $I_2$ |

FIG. 7

BRANCH INSTRUCTION

This application is the U.S. national phase of International Application No. PCT/GB2017/050774 filed Mar. 21, 2017 which designated the U.S. and claims priority to GB Patent Application No. 1604948.8 filed Mar. 23, 2016, the entire contents of each of which are hereby incorporated by reference.

The present disclosure relates to data processing systems. More particularly, the present disclosure relates to branch instructions within data processing systems.

It is known to provide data processing systems including circuitry and supporting methods for processing instructions. Some of these instructions cause a branch to program instructions at a branch target address.

In at least some embodiments the present disclosure provides one example there is a data processing apparatus comprising:

processing circuitry to perform processing operations specified by a sequence of program instructions;

an instruction decoder to decode said sequence of program instructions to generate control signals to control said processing circuitry to perform said processing operations; wherein said instruction decoder comprises branch-future instruction decoding circuitry to decode a branch-future instruction, said branch-future instruction having a programmable parameter associated with a branch target address and further programmable branch point data parameter indicative of a predetermined instruction following said branch-future instruction within said sequence of program instructions; and said processing circuitry comprises branch control circuitry controlled by said branch-future instruction decoding circuitry and responsive to said branch point data to trigger a branch to processing of program instructions starting from a branch target instruction corresponding to said branch target address when processing of said sequence of program instructions reaches said predetermined instruction.

In at least some embodiments the present disclosure provides apparatus for processing data comprising:

processing means to perform processing operations specified by a sequence of program instructions;

instruction decoder means responsive to said sequence of program instructions to generate control signals to control said processing means to perform said processing operations; wherein said instruction decoder means comprises branch-future instruction decoding means to decode a branch-future instruction, said branch-future instruction having programmable parameters respectively associated with a branch target address and branch point data indicative of a predetermined instruction following said branch-future instruction within said sequence of program instructions; and said processing means comprises branch control means controlled by said branch-future instruction decoding means and responsive to said branch point data to trigger a branch to processing of program instructions starting from a branch target instruction corresponding to said branch target address when processing of said sequence of program instructions reaches said predetermined instruction.

In at least some embodiments the present disclosure provides a method of processing data comprising:

performing processing operations specified by a sequence of program instructions;

decoding said sequence of program instructions to generate control signals to control said performing of said processing operations; wherein said decoding including decoding a branch-future instruction, said branch-future instruction having programmable parameters respectively associated with a branch target address and branch point data indicative of a predetermined instruction following said branch-future instruction within said sequence of program instructions; and triggering a branch to processing of program instructions starting from a branch target instruction corresponding to said branch target address when processing of said sequence of program instructions reaches said predetermined instruction.

Example embodiments will now be described, by way of example only, with reference to the accompanying drawings in which:

FIG. 1 schematically illustrates a data processing apparatus;

FIG. 2A schematically illustrates a branch-future instruction;

FIG. 2B schematically illustrates a sequence of program instructions including a branch-future instruction;

FIG. 2C schematically illustrates a number of branch-future instructions having different implementations of a programmable parameter indicating a predetermined instruction;

FIG. 2D schematically illustrates a number of branch-future instructions having different implementations of a programmable branch target address;

FIG. 3A schematically illustrates a sequence of program instructions including a branch-future instruction progressing through a processing pipeline;

FIG. 3B schematically illustrates the program flow of a sequence of instructions including a branch-future instruction;

FIG. 3C schematically illustrates the program flow of a sequence of instructions including a branch-future and link instruction;

FIG. 4 schematically illustrates a method of branch-future processing;

FIG. 5 schematically illustrates another method of branch-future processing including a process for responding to data invalidation.

Figure 6:
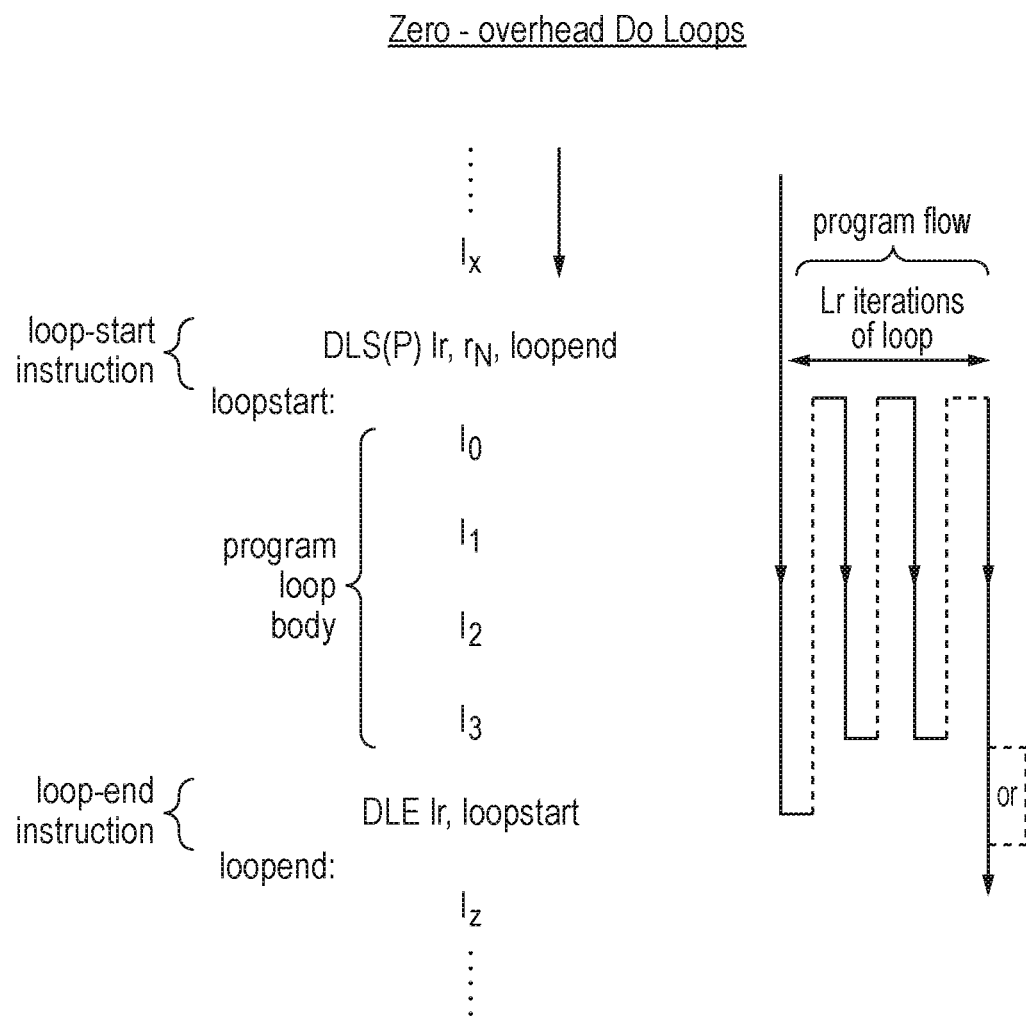
Figure 8:
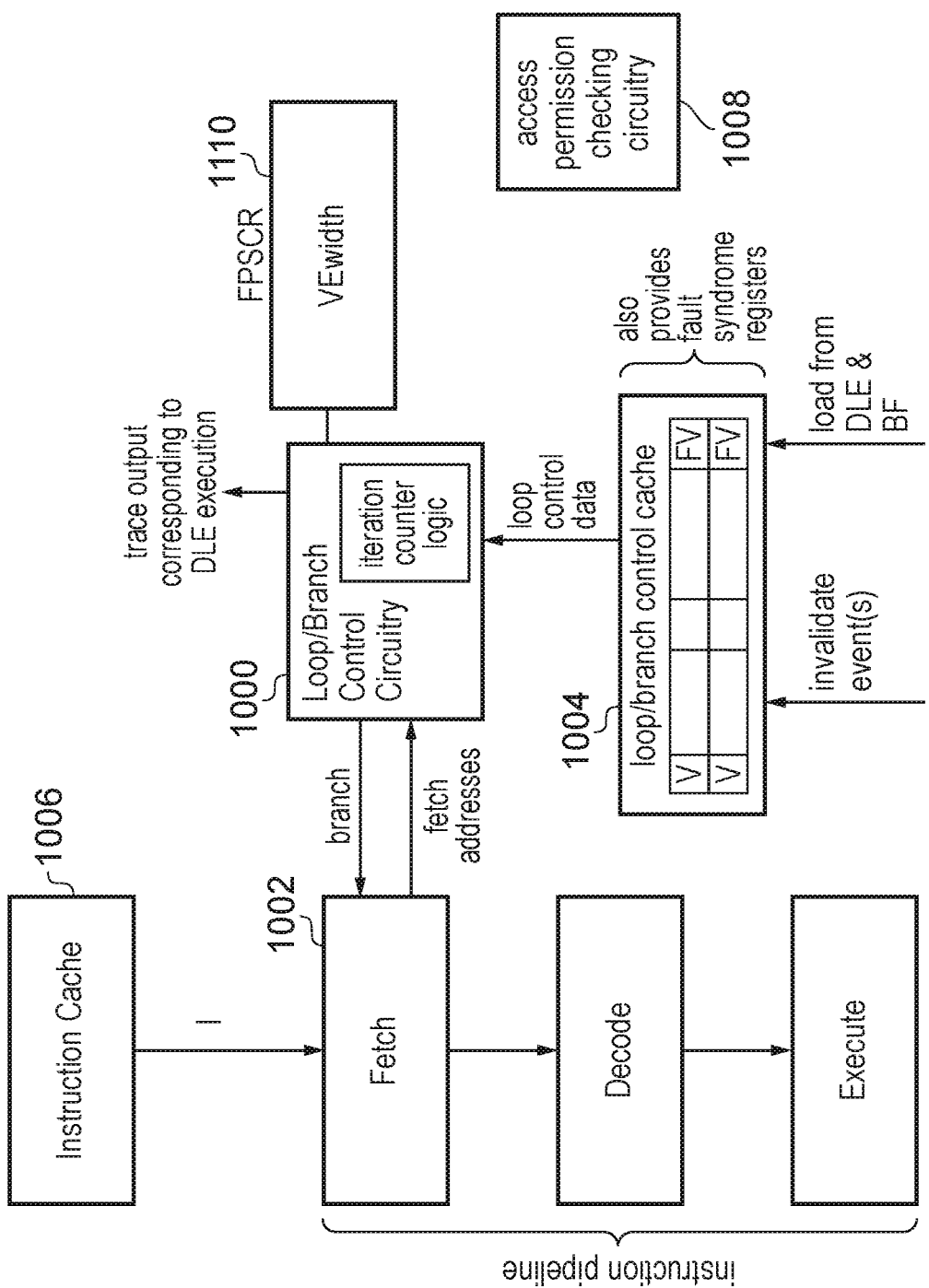
Figure 9:
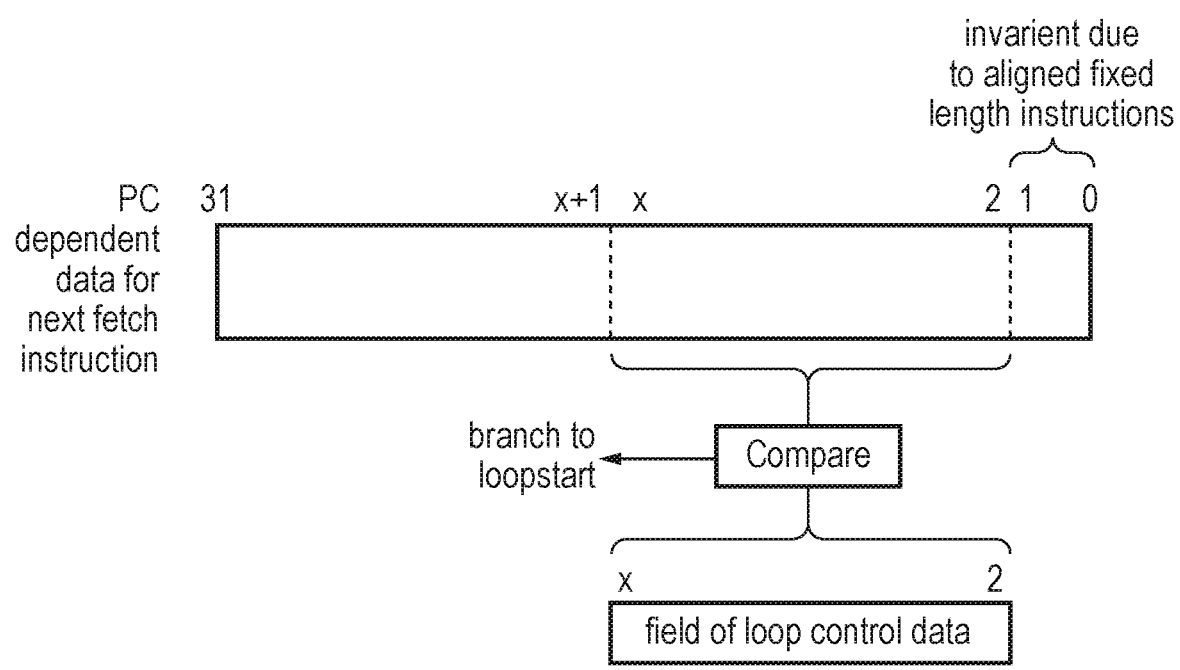
Figure 10A:
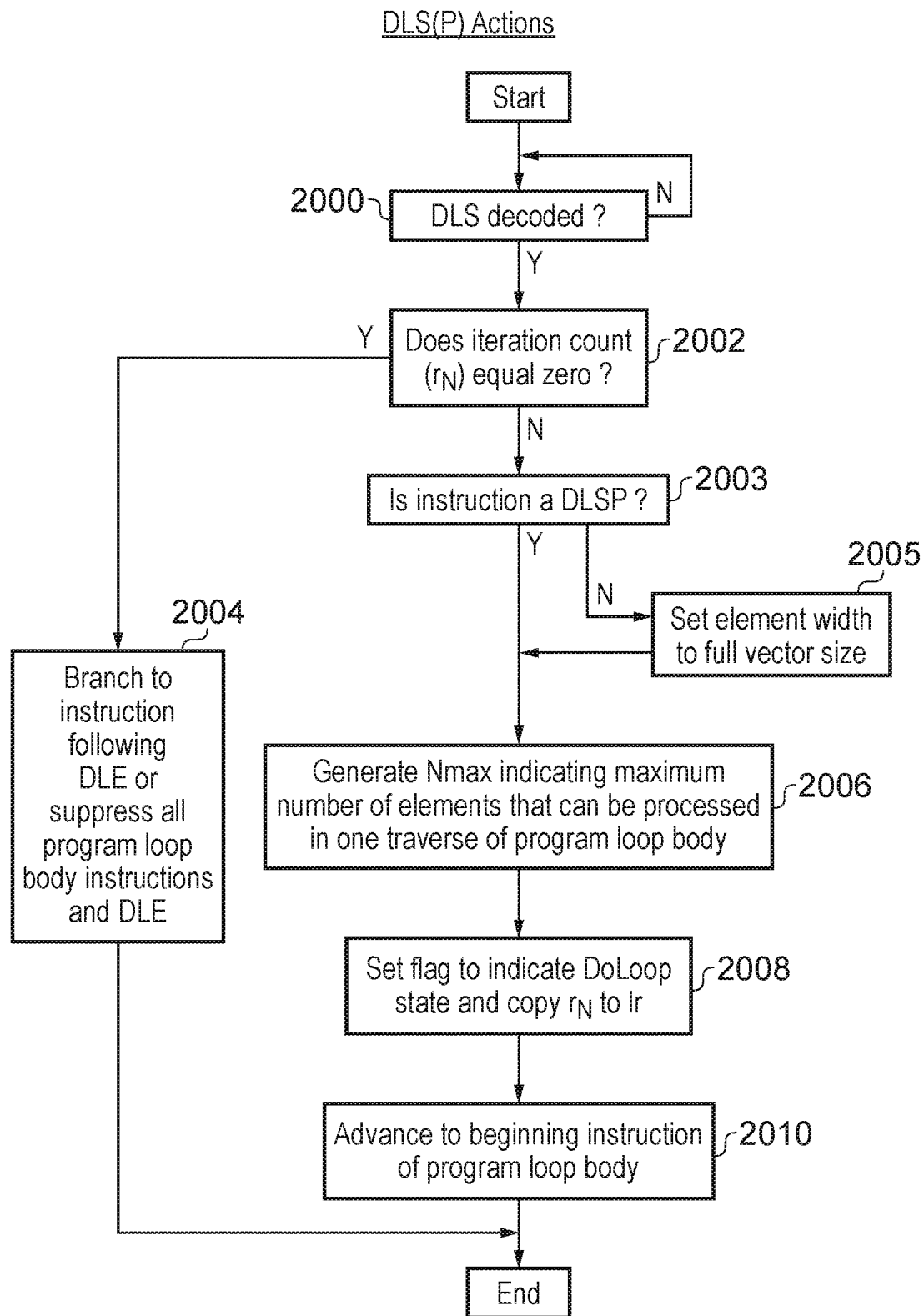
Figure 10B:
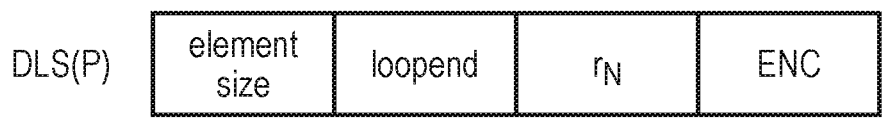
Figure 11:
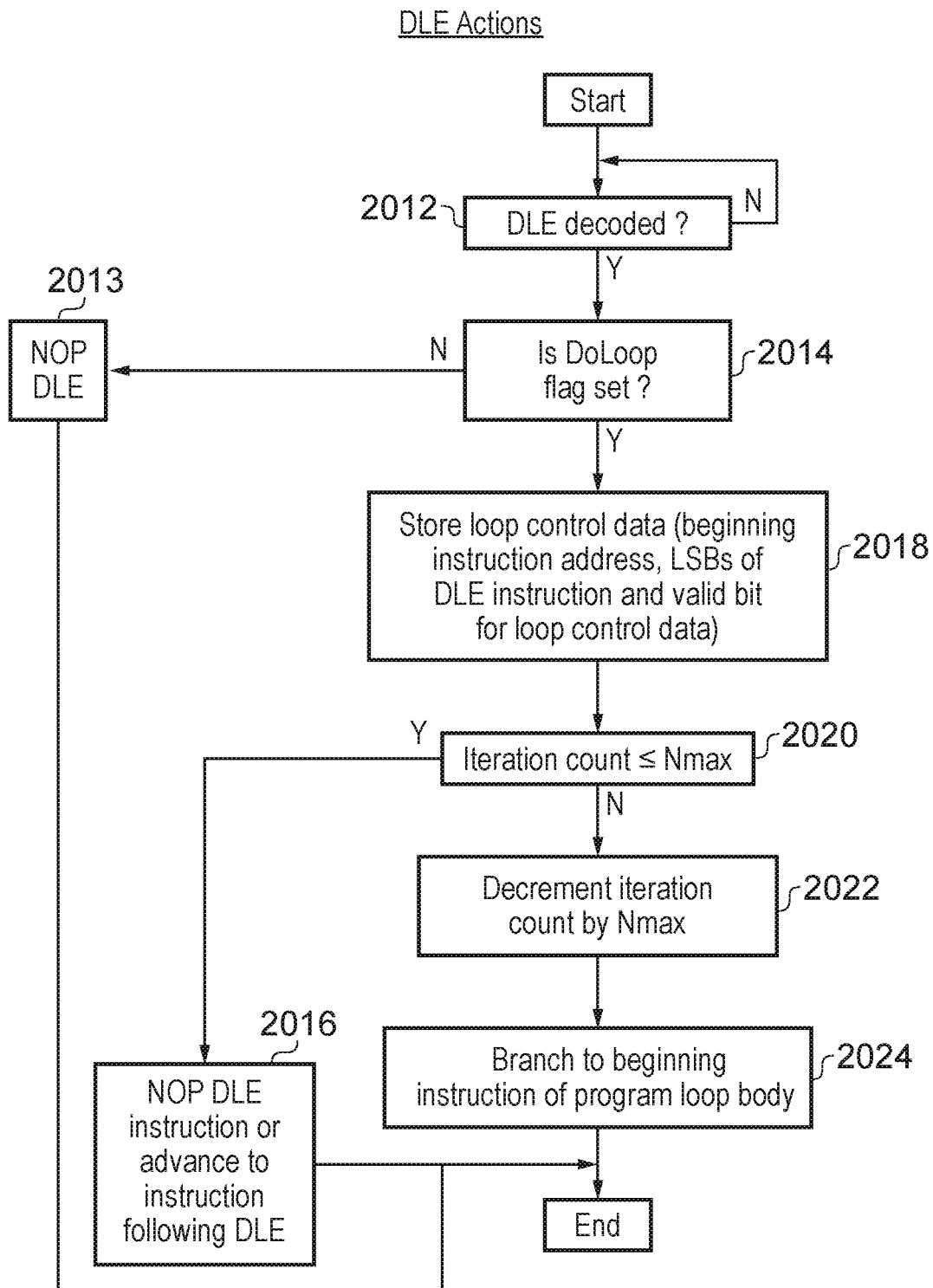
Figure 12:
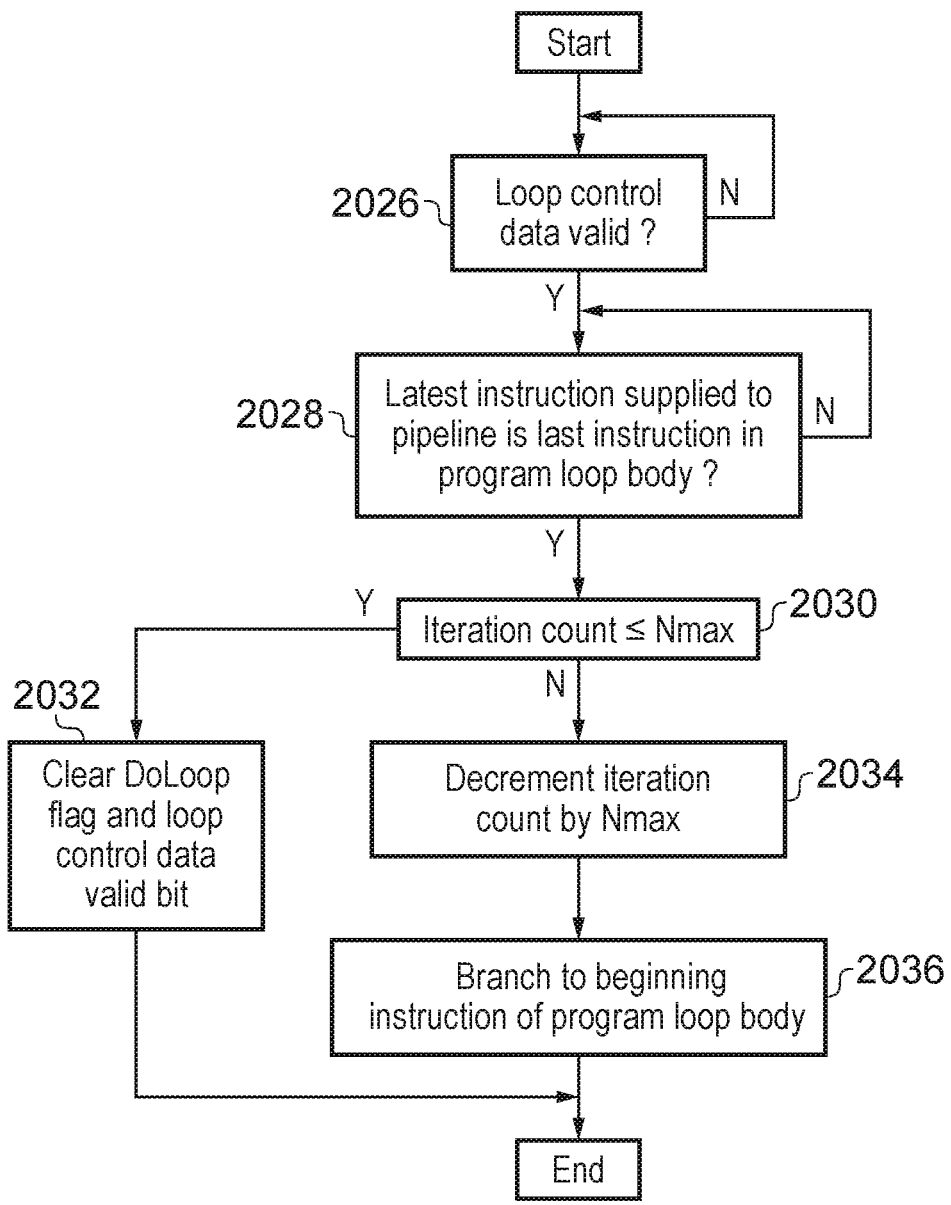
Figure 13:
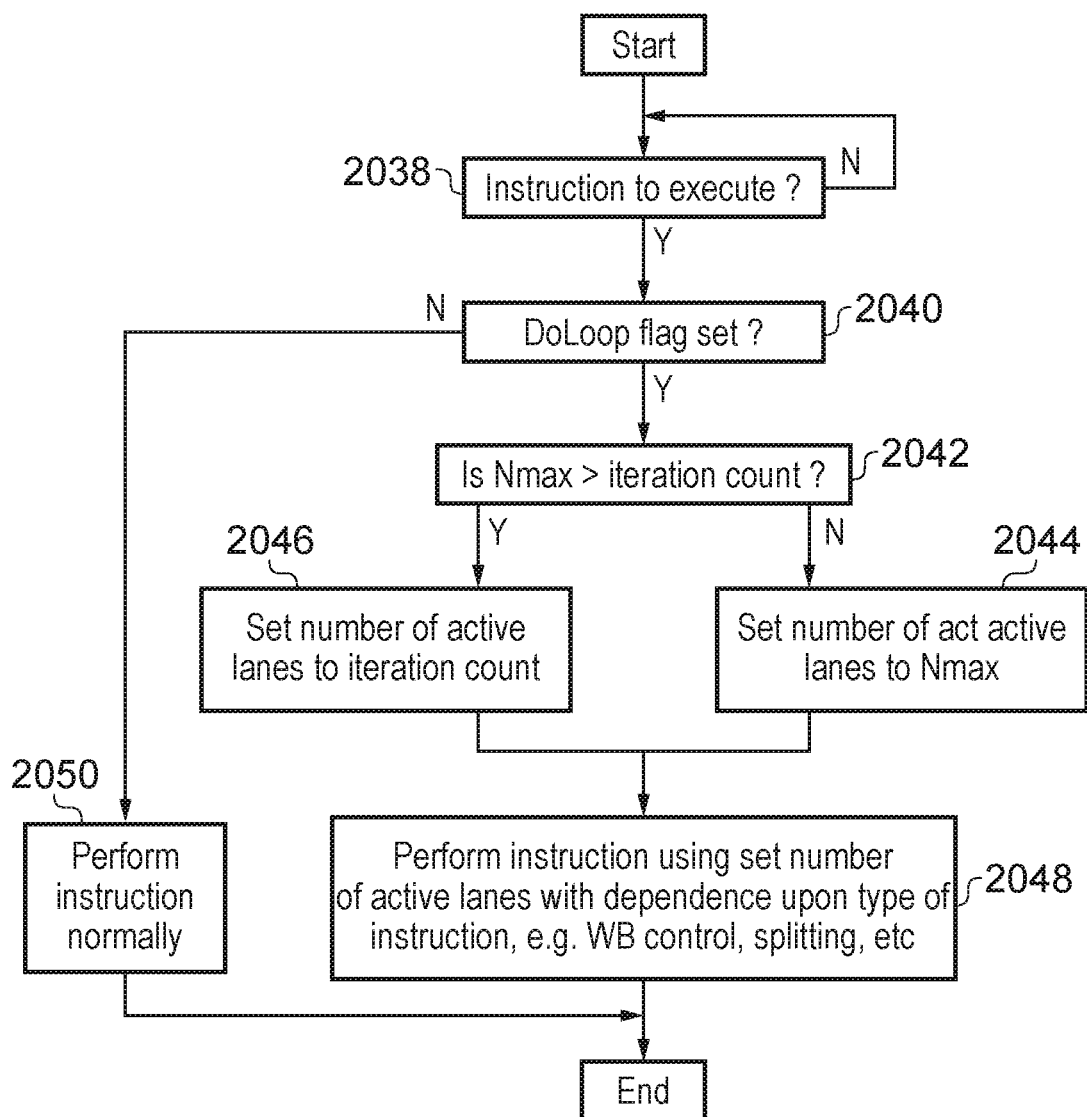
Figure 14A:
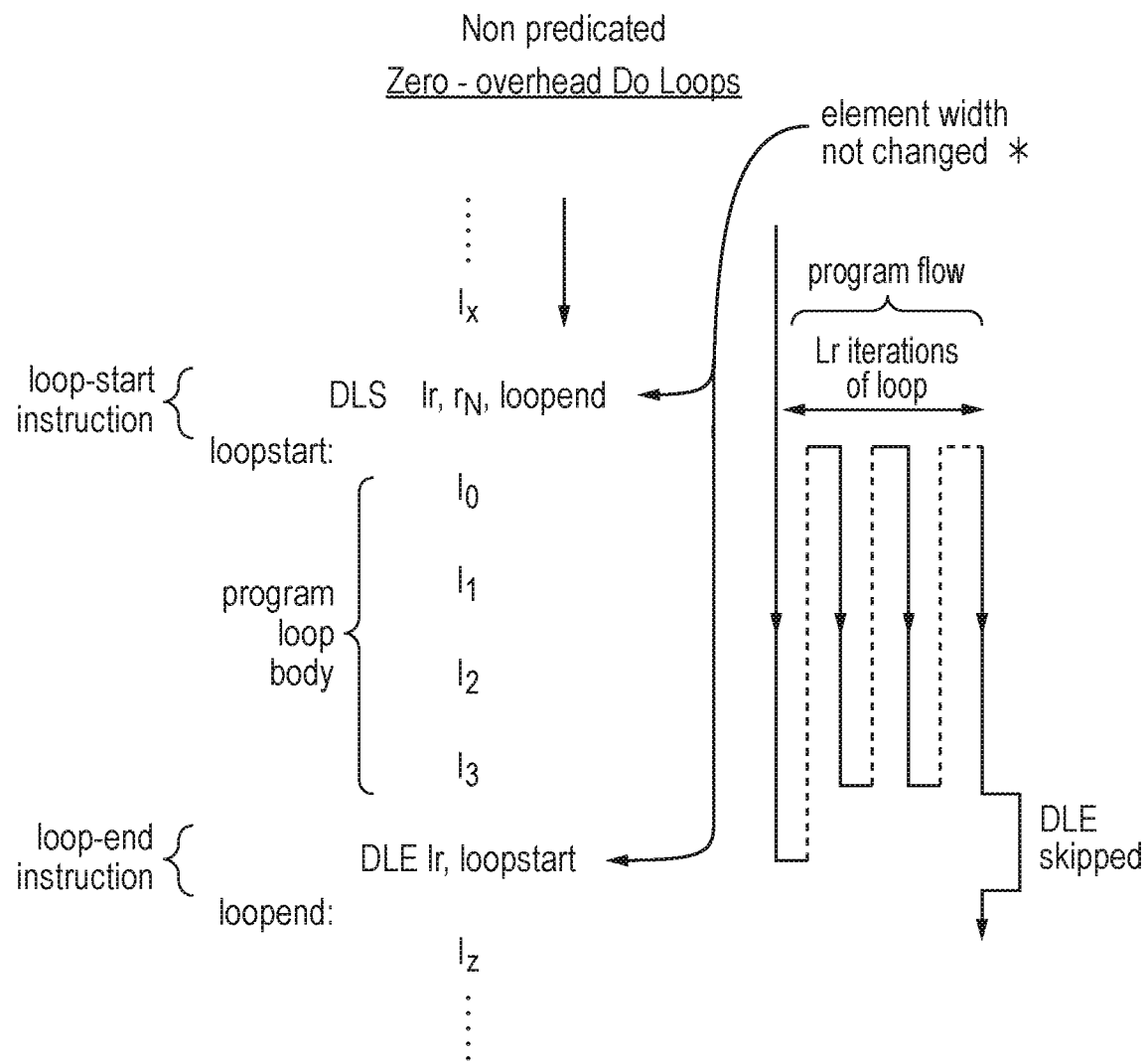
Figure 14B:
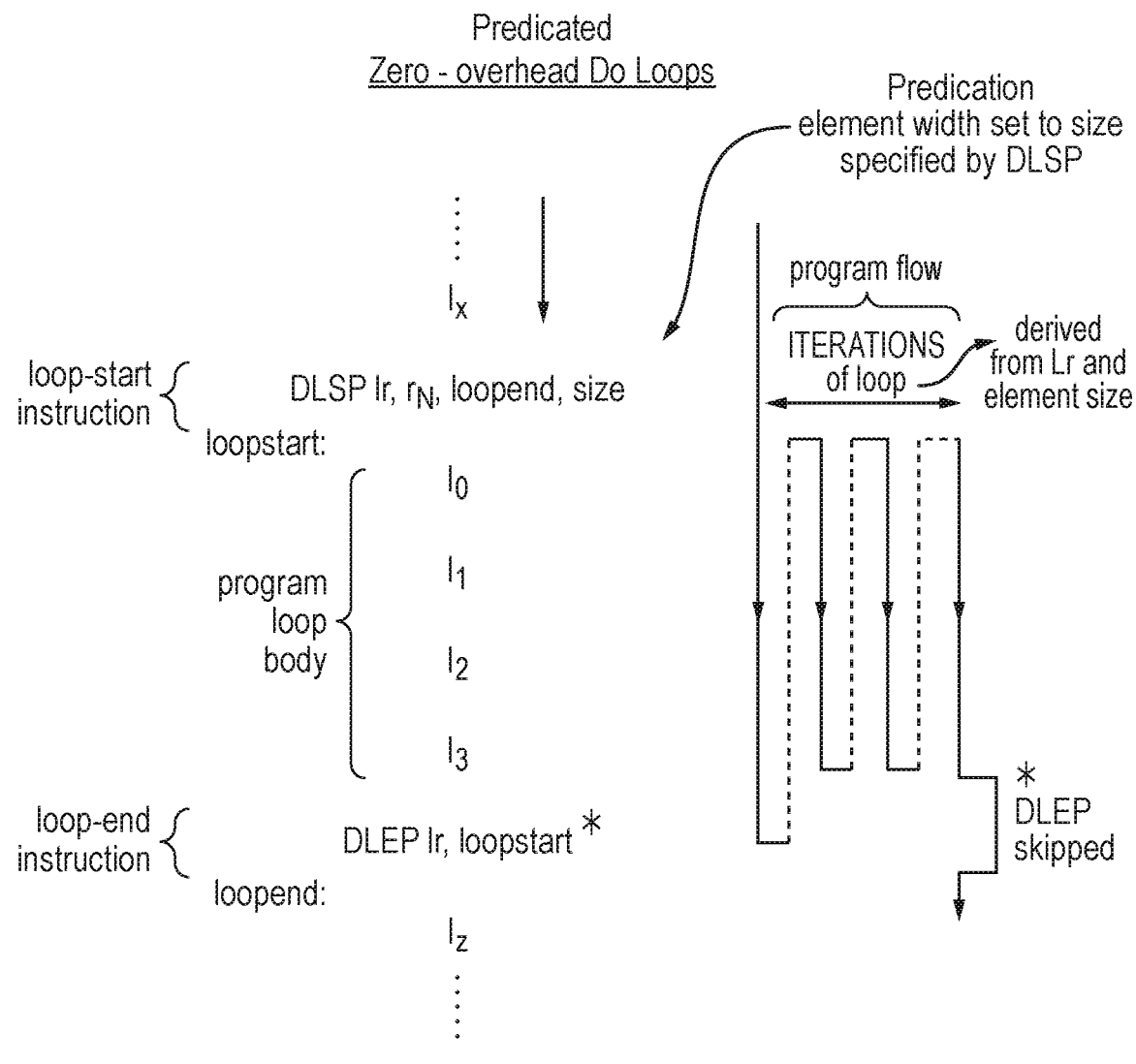
Figure 14C:
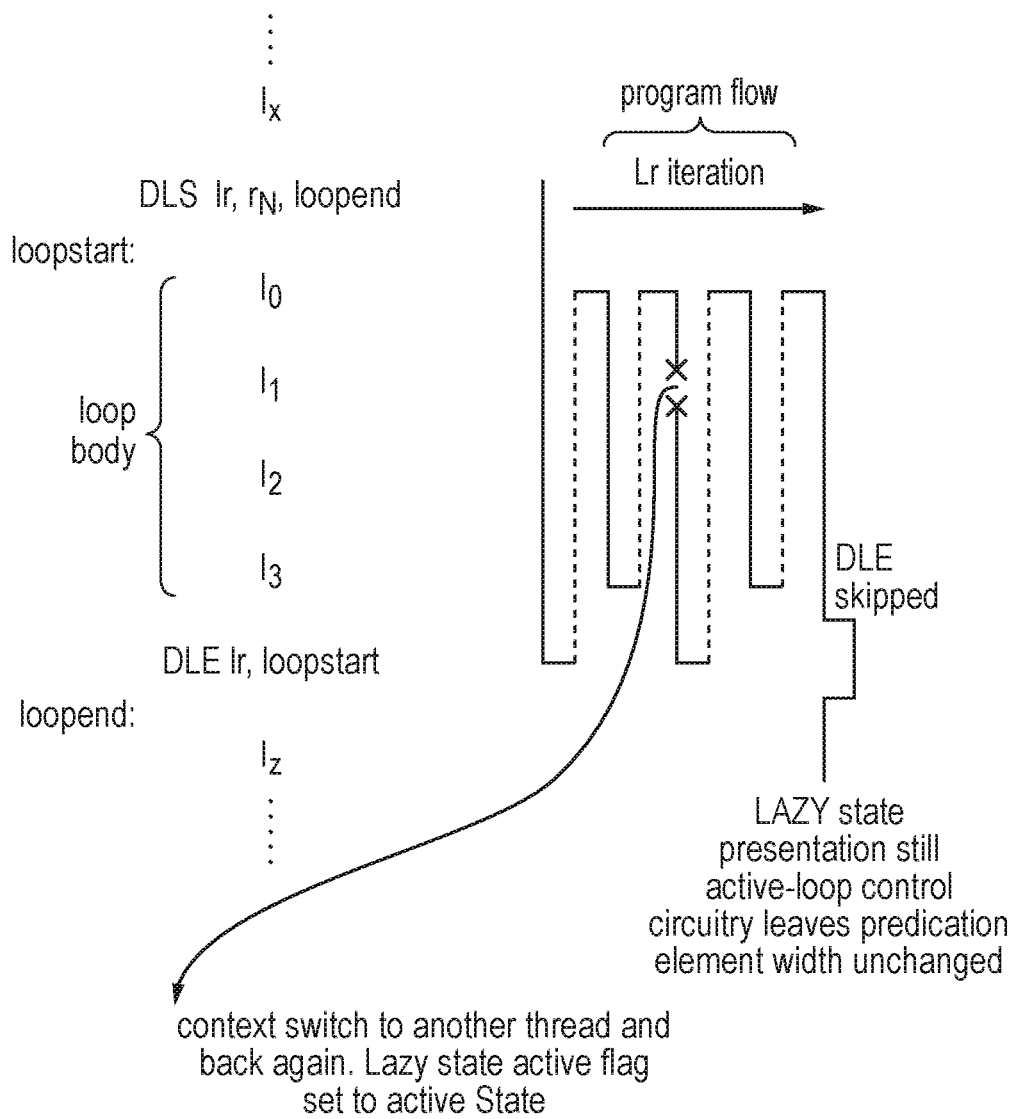
Figure 14D:
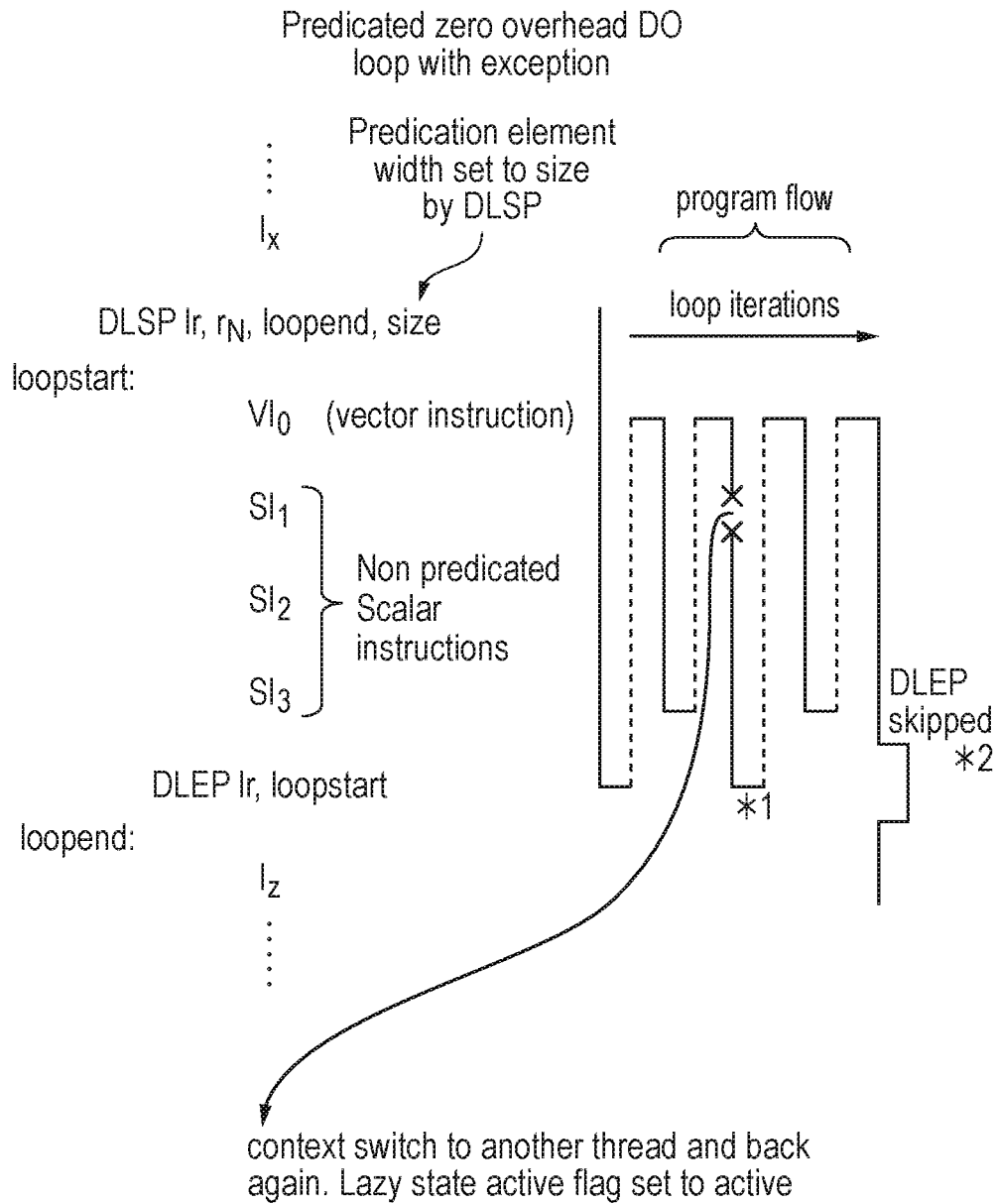
Figure 14E:
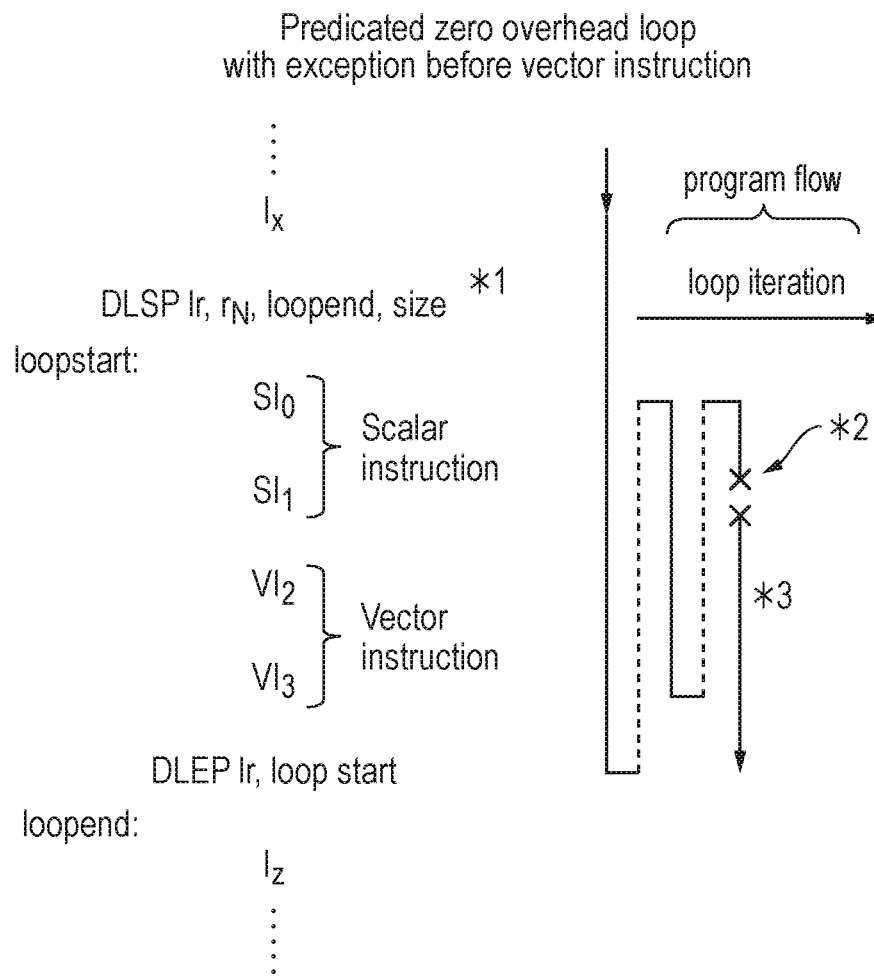
Figure 15:
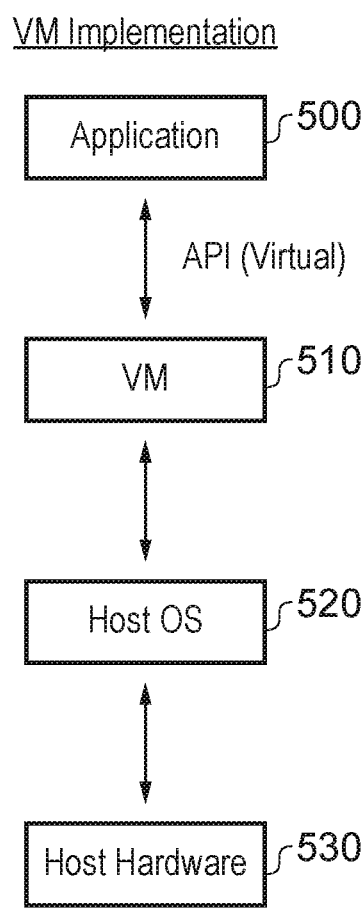

FIG. 6 schematically illustrates zero-overhead loop behaviour;

FIG. 7 schematically illustrates processing pipeline stage content when executing instructions following the zero-overhead loop behaviour of FIG. 6;

FIG. 8 schematically illustrates a processing pipeline including loop/branch control circuitry to control zero-overhead loop behaviour and branch future instruction behaviour;

FIG. 9 illustrates how a comparison may be made between a program counter value and a field of loop control data to identify a point in program execution at which a branch to a loop start position should be performed;

FIG. 10A is a flow diagram schematically illustrating the behaviour of a loop-start program instruction;

FIG. 10B schematically illustrates an implementation of the loop-start instruction;

FIG. 11 is a flow diagram schematically illustrating the behaviour of a loop-end program instruction;

FIG. 12 is a flow diagram schematically illustrating the action of loop control circuitry when executing a program loop body as part of zero-overhead loop behaviour;

FIG. 13 is a flow diagram schematically illustrating control of execution of instructions within a program loop body to provide predication whereby vector instructions may operate upon multiple vector elements with the particular vector elements active during a given iteration of the program loop body being controlled by predication;

FIGS. 14A to 14E show examples of execution of non-predicated and predicated loops; and FIG. 15 schematically illustrates a virtual machine implementation.

The present disclosure recognises that branch instructions may cause delays to processing that reduce performance. To address this problem, the present disclosure provides branch-future instruction decoding circuitry to decode a branch-future instruction. The branch-future instruction includes a programmable parameter associated with a branch target address. The branch target address corresponds to a program instruction which may be processed by the processing circuitry following a branch. The branch-future instruction also includes a further programmable branch point data parameter indicative of a predetermined instruction following the branch-future instruction within a sequence of program instructions. By including a further programmable branch point data parameter in the branch-future instruction, the processing circuitry can prepare to branch to the branch target address in advance of the branch point. Therefore, when the branch point is reached a delay to processing may be avoided or reduced.

Figure 1:
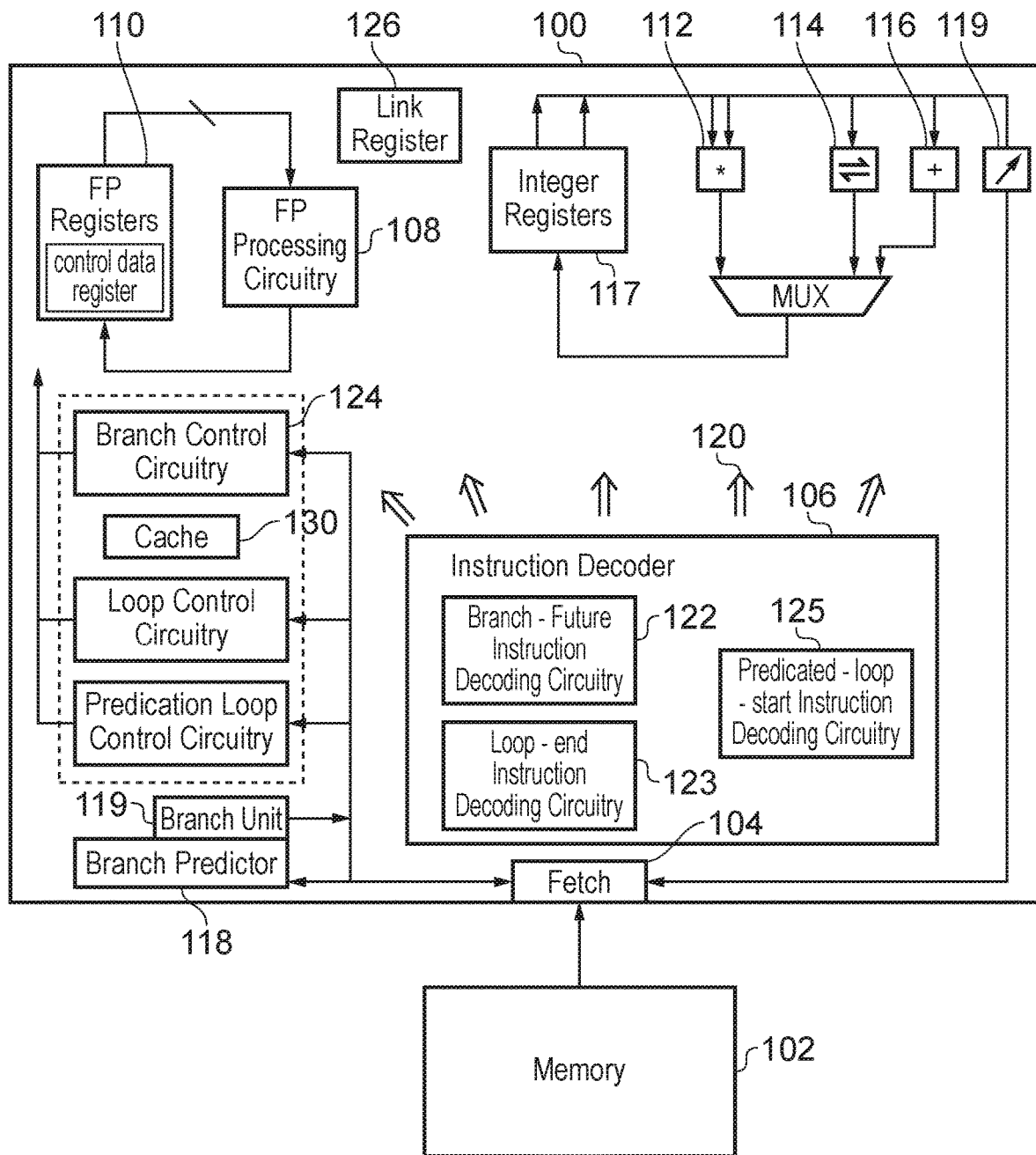

FIG. 1 schematically illustrates an example of a data processing apparatus 100 coupled to a memory 102. The memory 102 stores program instructions and operand data. Instructions are fetched by a fetch unit 104, and decoded by an instruction decoder 106 to generate control signals 120 to control processing circuitry. The processing circuitry may include floating point processing circuitry 108 and floating point registers 110 for performing data processing operations on floating point operands received from or stored to the memory 102. The processing circuitry also includes a multiplier 112, a shifter 114, an adder 116 and integer registers 117 for performing data processing operations on integer operands received from or store to the memory 102.

Some instructions fetched by the fetch unit may be branch instructions that branch processing from following a current sequence of program instructions to program instructions stored at memory address locations starting from a branch target address. To accommodate branch instructions the data processing apparatus 100 includes branch unit 119 that may redirect program flow to a branch target address. To accelerate the processing of branch instructions the data processing apparatus 100 may include a branch predictor 118. The branch predicator 118 stores state data, and predicts whether branch instructions will be taken or not taken based on the state data. The branch unit 119 may also be controlled by loop control data to support/provide zero-overhead loop behaviour (in place of or in addition to other loop control circuitry) as will be described further herein. The branch predictor 118 may also be populated with loop control as will be described further herein.

Figures 2A, 2B:
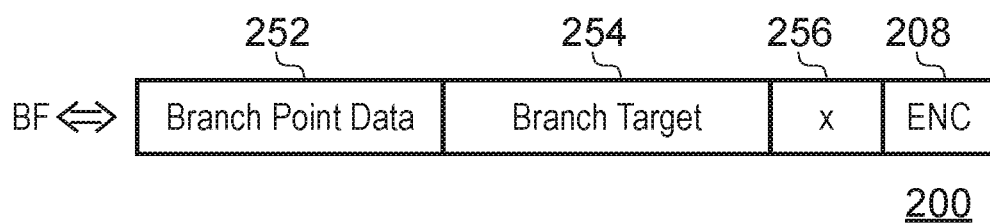

FIG. 2A schematically illustrates an example of a branch-future instruction BF 200. The branch-future instruction 200 includes a programmable parameter indicative of a branch target address 254, a programmable parameter providing programmable branch point data 252, and encoding bits 258 that identify the instruction as a branch future instruction. The branch point data 252 indicates a predetermined instruction that follows the branch-future instruction BF in a sequence of program instructions to be processed by a data processing apparatus. The branch target address 254 indicates the location of an instruction which processing should branch to when the program flow reaches the predetermined instruction. A number of bits, x 256, may be reserved for other parameters.

Returning to FIG. 1, the data processing apparatus includes branch-future instruction decoding circuitry 122 for decoding branch-future instructions such as those shown in FIG. 2A in response to identifying an instruction is the branch-future by matching the branch future encoding bits 258. Upon decoding the branch-future instruction the branch-future instruction decoding circuitry 122 controls the processing circuitry to store within a branch control data cache 130 branch target address data, and branch point data indicative of the predetermined instruction. By storing data in this way, the data processing apparatus 100 can be provided with an indication in advance of a when a branch from processing of the normal sequence of program instructions may occur, and the target address to where the branch will direct the program execution point. Therefore, when the program flow reaches the predetermined instruction indicated by the branch-future instruction, the branch can occur with a reduced or no delay to processing. The data processing apparatus also includes loop-end instruction decoding circuitry 123 and predicated-loop-start-instruction decoding circuitry 125 (which also serves non-predicated-loop-start-instructions decoding circuitry) to control the processing circuitry to respond to loop-end instructions DLE and loop-start instructions DLS(P) as will be described further below.

The branch control data cache 130 may store data corresponding to the branch point as a proper subset of bits indicative of a memory storage address of the predetermined instruction starting from a least significant bit end of bits of a memory storage address that distinguishes between starting storage addresses of instructions. In order to determine when the program flow has reached the predetermined instruction, these bits can be compared (e.g. see FIG. 9 described below) to a value indicative of the program counter, a value indicative of the next instruction fetch address, or a value that is indicative of processing activity of the data processing apparatus 100.

FIG. 2B shows program code including a branch-future instruction BF, and a sequence of program instructions, $ADD_1$, $ADD_2$ and BX, which may be processed by the data processing apparatus 100. The branch-future instruction BF initially sets up the data processing apparatus 100 to branch to a target address when the program flow reaches the predetermined instruction BX in the manner described above. Having decoded the branch-future instruction, the data processing apparatus 100 will continue to process the sequence of program instructions including $ADD_1$ and $ADD_2$. Once the data processing apparatus 100 has processed $ADD_2$, the branch point data stored in the cache 130 indicates that a branch is to occur. In addition, the branch control data cache 130 also stores corresponding branch target data corresponding to an address of the instruction to be branched to. Thus the branch to processing program instructions starting from the branch target instruction corresponding to the branch target data may occur without causing a delay to processing or a bubble (unused slot) to be introduced into a processing pipeline.

FIG. 2C illustrates different examples of the programmable branch point data parameter that indicates a predetermined instruction with respect to the sequence of instructions shown in FIG. 2B. In branch-future instruction 201 of FIG. 2C, the branch point data comprises data indicative of the address of the branch instruction BX. Branch control circuitry 124 shown in FIG. 1 may match the data indicative of the address of BX to a value corresponding to the next instruction being fetched. Then, when it is determined that the program flow has reached the branch instruction BX, the branch control circuitry 124 triggers a branch to an instruction indicated by the branch target of branch-future instruction 201.

The branch point data may alternatively be data indicative of instruction $ADD_2$, as shown in branch-future instruction 202 of FIG. 2C. Therefore, in the same way as branch-future instruction 201, the branch control circuitry 124 triggers a branch to the branch target when the program flow has fetched $ADD_2$ and reaches BX.

Branch-future instruction 203 of FIG. 2C shows branch point data that includes an address offset from the branch-future instruction BF to the predetermined instruction BX in FIG. 2B. In the example of FIG. 2B, $ADD_1$ and $ADD_2$ are 32-bit instructions. Therefore, an address offset of 8 bytes indicates the predetermined instruction BX.

Branch-future instruction 204 of FIG. 2C shows branch point data indicating a remaining instruction count. The remaining instruction count indicates the number of instructions to be executed following the branch future instruction before the predetermined instruction is reached. In the example of FIG. 2B, this corresponds to $ADD_1$ and $ADD_2$. Hence the remaining instruction count in this example is +2.

Branch-future instruction 205 of FIG. 2C shows remaining size data indicative of a number of program storage locations remaining to be processed before the predetermined instruction is reached. If the instruction ADD and $ADD_2$ were variable length instructions respectively of 32-bits and 16-bits, then their total size would be 6 bytes and so the remaining size value is 6.

Branch-future instruction 211 of FIG. 2C shows branch point data that includes an address offset from the branch-future instruction BF to the predetermined instruction BX in FIG. 2B. In the example of FIG. 2B, $ADD_1$ and $ADD_2$ are 32-bit instructions. Therefore, the address offset is 8 bytes, however a value of 4 is used to indicate the predetermined instruction BX, as all instructions are aligned to at least a 2 byte boundary and therefore the least significant bit of the value 8 isn't required to uniquely identify the address of the predetermined instruction.

FIG. 2D shows some other examples of branch-future instructions having different implementations of the programmable parameter associated with the branch target address. As shown in branch-future instruction 206 of FIG. 2D, the branch target may be indicated by a register specifier <$R_m$> that specifies a register location storing a memory address of the instruction to be branched to by the processing circuitry.

Branch-instruction 207 of FIG. 2D shows another example where the branch target is indicated by an immediate offset value <imm> that indicates the address of the instruction to be branched to by an offset from a point relative to the memory address of the branch-future instruction.

Branch-future instruction 208 and branch-future instruction 209 of FIG. 2D show examples of branch-future instructions that also include a link specifier. The link specifier controls the processing circuitry to store a return address in a link register LR. When the program flow completes processing of the program instructions starting at the branch target and reaches a return instruction, a further branch is performed to the address stored in the link register. Therefore, processing may return to an original stream of program instructions once the program instructions at the branch target have been processed. In other examples, the return address may be stored at any address in a storage area specified by a predetermined offset applied to a stack point register.

FIG. 2D also shows a conditional branch-future instruction 210. The conditional branch-future instruction 210 includes some condition code: op{cond}. When the conditional branch-future instruction is processed, the branch-future instruction decoder determines whether the condition codes have been satisfied, and the conditional branch-future instruction is processed in dependence of this determination.

Figures 3A, 3B:
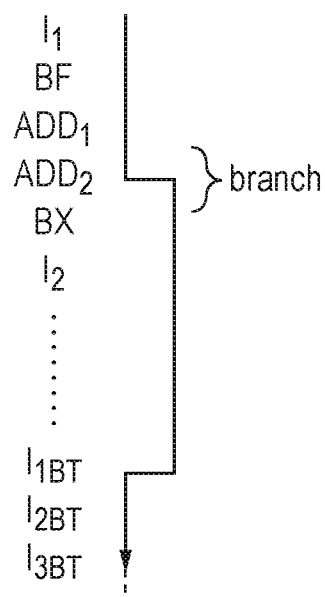

FIG. 3A illustrates a sequence of instructions including a branch-future instruction progressing through a processing pipeline of the data processing apparatus 100 of FIG. 1 (a simple three stage pipeline: fetch, decode and execute). In cycle 0, an instruction $I_1$ is fed to the fetch stage of the processing pipeline. In cycle 1, the first instruction of the sequence of instructions shown in FIG. 2B is fed into the pipeline, i.e. a branch-future instruction BF. Instruction $I_1$ also progresses to the decode stage in this cycle. In cycle 2, add instruction $ADD_1$ is fed into the pipeline, and the branch-future instruction BF is decoded. Upon decoding the branch-future instruction BF, the branch-future instruction decoding circuitry 122 obtains branch point data indicative of a predetermined instruction following the branch future instruction BF within the sequence of program instructions, and branch target data, which may be stored in the branch control data cache 130. In this case the branch point data is indicative of another branch instruction BX.

In cycle 3, another instruction, $ADD_2$ is fed into the processing pipeline. The branch control circuitry 124 identifies that the sequence of program instructions has reached the predetermined instruction, and that a branch to processing of program instructions starting from a branch target address should be triggered. Therefore, in the next cycle, cycle 4, a first instruction $I_{1BT}$ from the program instructions at the branch target address is fed into the processing pipeline. Similarly, in cycle 5 and cycle 6 two more instructions, $I_{2BT}$ and $I_{3BT}$ are fed into the processing pipeline.

FIG. 3B illustrates the program flow of the data processing apparatus 100 when processing the instructions of FIG. 3A. As can be seen, a first sequence of instructions including $I_1$, BF, $ADD_1$ and $ADD_2$ are first processed by the data processing apparatus. Due to the branch-future instruction BF, the processing of $ADD_2$ indicates that a branch should occur to another sequence of program instructions starting from a branch target address. This other sequence includes branch target instructions $I_{1BT}$, $I_{2BT}$ and $I_{3BT}$. As can be seen in FIG. 3B, the program flow branches away from the first sequence of program instructions including the branch-future instruction, and processes the branch target instructions. $I_{1BT}$, $I_{2BT}$ and $I_{3BT}$ may be arithmetic and logical instructions, data handling instructions that cause memory operations to be performed, or any other type of instruction.

As shown in FIG. 3B, the branch-future instruction BF causes a branch immediately after the $ADD_2$ instruction bypassing the branch instruction BX. Branch instruction BX may be included in the sequence of program instruction for the event that branch future state data stored in the branch control data cache 130 is invalidated between the branch-future instruction BF and BX. For example, in the event of:

said processing circuitry being reset; loop control circuitry or a loop-end instruction determining that no further iterations of a program loop comprising said branch-future instruction are required; an exception being entered; exception tail-chaining whereby processing proceeds directly from processing a current exception to processing a next exception without restoring state prior to said current exception; execution of a branch instruction with greater than a predetermined immediate target address range; execution of a branch instruction; a loop-start instruction; returning from an exception; execution of an instruction that causes an instruction cache of said data processing apparatus to be invalidated; execution of an instruction that disables caching of said control data; execution of an instruction that disables branch prediction; said processing circuitry determining that a branch within a program loop body targets an address that is not between a loop-start instruction and a loop-end instruction; a switch between a secure mode of operation and a non-secure mode of operation; and one or more implementation defined conditions; any stored branch point data corresponding to the branch-future instruction may be invalidated. As such, it may no longer be feasible to perform the branch indicated by the branch-future instruction. Therefore, the branch instruction BX is included in the sequence program instructions as a back up in order to branch to the target address. However, under normal circumstances, the branch instruction BX will not be processed.

Figure 3C:
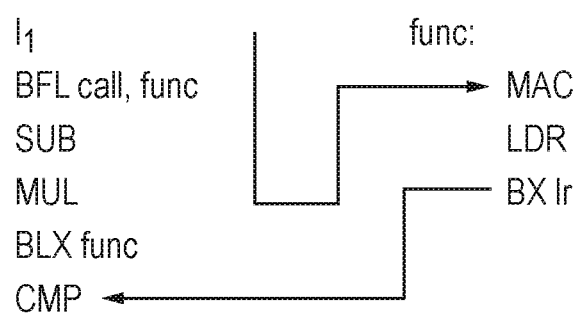

FIG. 3C schematically illustrates a sequence of program instructions including a branch-future and link instruction BFL. The BFL instruction results in a branch to the sub routine func: when the instruction MUL is reached. The BFL instruction also causes a return address value to be stored into the link register LR, the return address value indicates the address of the CMP instruction to be returned to when the subroutine func: has been executed. In some embodiments the BFL instruction may store the return address value into the link register LR. In other embodiments the BFL instruction may store a link indicator flag within the branch control data cache 130, and the branch control circuitry 124 may store the return address value to the link register LR when the branch to the branch target address is triggered if the link indicator flag is set.

Figure 4:
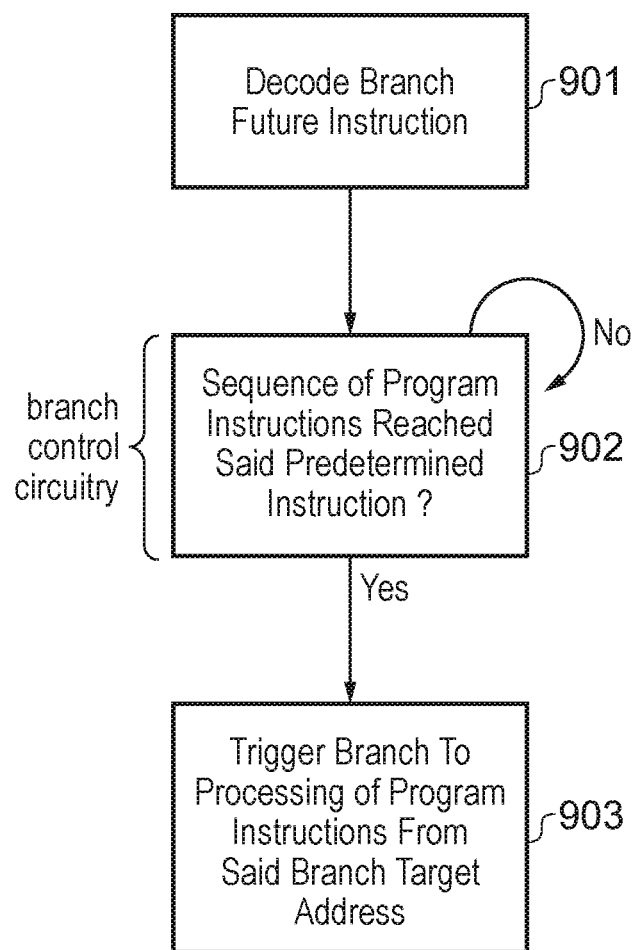

FIG. 4 shows an example of a method for branch-future processing. In step 401 a branch-future instruction is decoded. The branch-future instruction includes programmable parameters respectively indicating a branch target address and branch point data indicative of a predetermined instruction following the branch-future instruction within a sequence of program instructions. The method then proceeds to step 402, where it is determined whether the sequence of program instructions has reached the predetermined instruction. When it is determined that the sequence of program instruction has reached the predetermined instruction, the method proceeds to step 403 where a branch to processing of program instruction from the branch target address is triggered.

Figure 5:
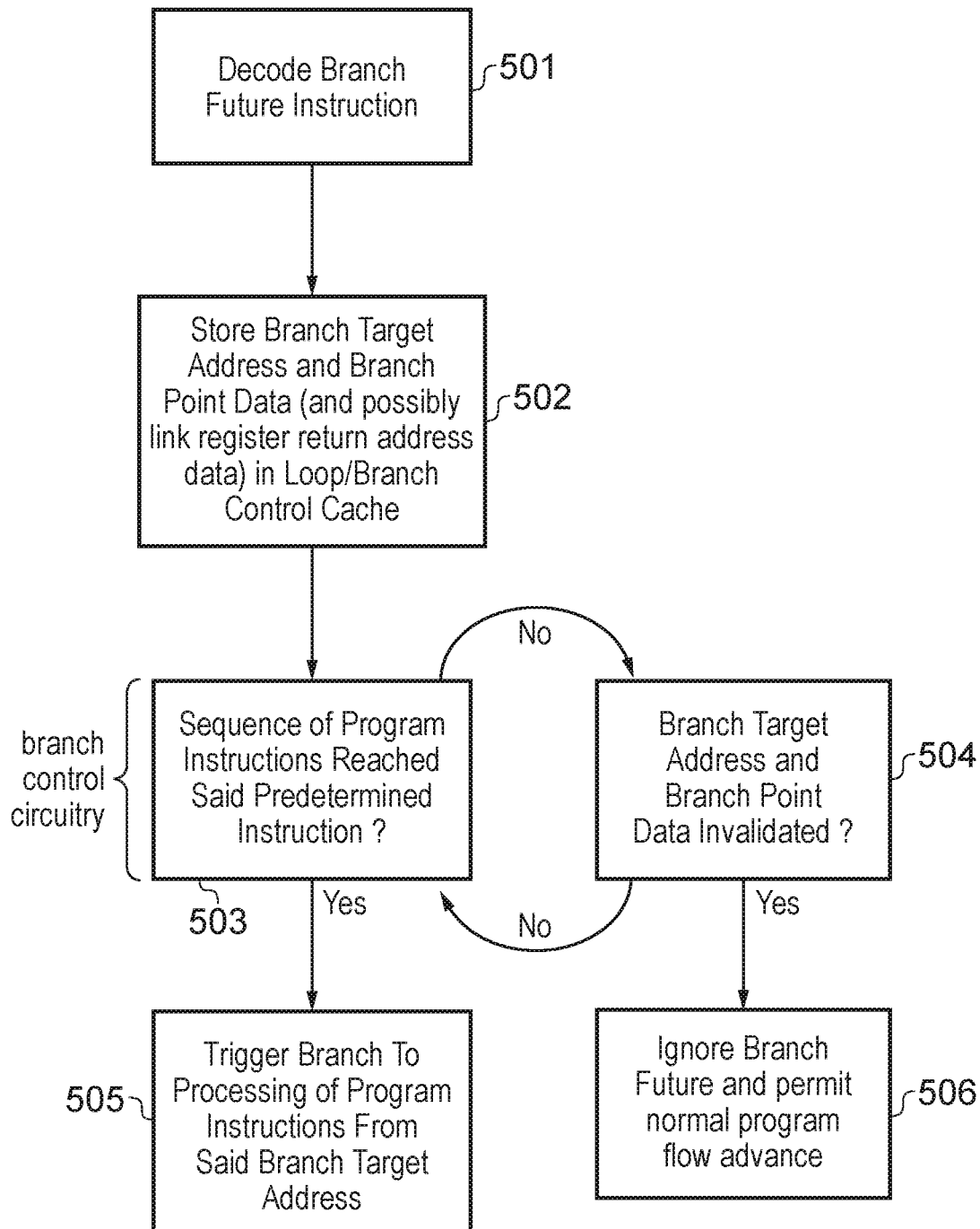
FIG. 5A illustrates an example of processing a conditional branch future instruction.
FIG. 5B illustrates an example of processing a pair of conditional branch future instructions corresponding to opposite conditions.

FIG. 5 shows another example of a method for branch-future processing. In step 501, a branch-future instruction is decoded. As previously described, the branch-future instruction includes a branch target address, and branch point data indicative of a predetermined instruction following said branch-future instruction within said sequence of program instructions. In step 502, branch point data and a branch target address are stored in loop/branch control cache. In the case of branch future with link instructions the return address may also be stored with the link register LR, in alternative embodiments a branch future with link instruction would instead cause a link indicator flag to be stored. Processing then proceeds to step 503, where it is monitored whether the sequence of program instructions being processed has reached the predetermined instruction. If the predetermined instruction has not been reached, it is checked whether the branch target address and the branch point data have been invalidated in step 504. In the event of invalidation at step 504, processing moves to step 506 where the branch-future instruction is ignored, and regular program flow advances. However, if the data is determined to still be valid, processing returns to step 503. When it is determined that the predetermined instruction has been reached, processing proceeds to step 505 where a branch to processing of program instructions starting from the branch target address is triggered. In embodiments that store a link indicator flag in step 502 the processing circuitry would check to see if this flag is set in step 505, and upon determining that it is set the return address would be stored in the link register LR.

Figures 5A, 5B:
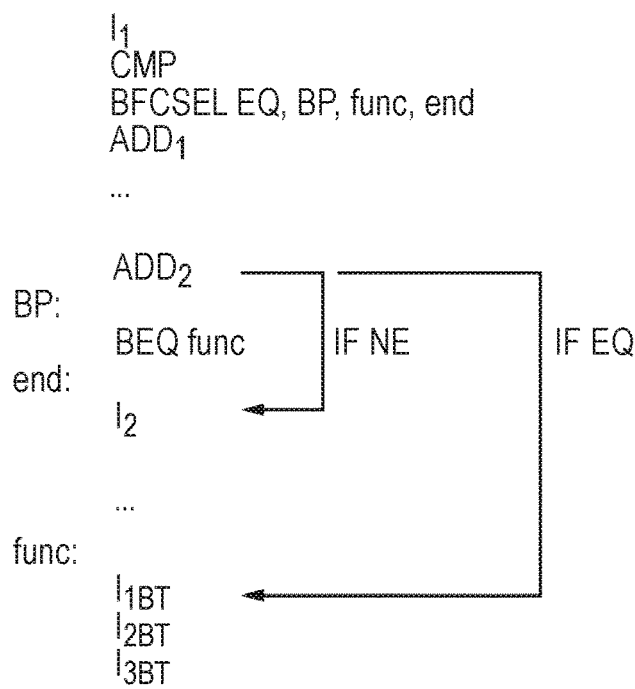

FIG. 5A shows an example sequence of instructions to illustrate a problem that can arise with conditional branch-future instructions and a technique for addressing this problem. The sequence of instructions includes a condition branch BEQ for branching to a certain target address if a corresponding condition (e.g. equals EQ) is satisfied. A corresponding conditional branch-future instruction BFCSEL is included specifying the same condition EQ as the branch BEQ and also specifying a parameter 'func' indicating the branch target address and branch point data BP for identifying the address BP just before which the branch should be taken. Hence, if the EQ condition is satisfied, a branch to the branch target instruction I1BT is to be triggered when processing reaches the instruction ADD2 just before point BP. Normally, if the condition associated with a conditional branch is not met, no branch should be taken and instead program flow continues sequentially. One would expect the branch future instruction BF to behave in a similar manner, so that if the condition for the branch future instruction BFCSEL is not satisfied, then following the ADD2 instruction the branch to the branch target address 'func' should not be taken, and instead the next instruction following the instruction ADD2 at the branch point BP should be executed.

However, the instruction following ADD2 is the conditional branch BEQ corresponding to the branch future instruction BFCSEL, and as the EQ condition is already known not to be satisfied for the branch future instruction BFCSEL, the branch BEQ will also fail its condition. Hence, when the condition is failed there are two 'wasted' instructions (the branch future instruction BFCSEL and the branch instruction BEQ) introduced into the processing pipeline which take up fetch/decode/issue/execution slots but do not trigger any real processing operation (a failed branch essentially behaves as a no-operation (NOP) instruction). Hence, while including the branch future instruction BFCSEL can improve performance in cases when the branch condition is passed, when the condition is failed including the branch future instruction BFCSEL actually incurs a performance penalty because there are now two wasted instructions (the branch future instruction BFCSEL and the branch BEQ), instead of one wasted instruction (the branch BEQ) if the branch future instruction BFCSEL had not been included. This makes it difficult for a compiler to determine whether it is justified including the branch future instruction BFCSEL—the decision on whether to do so or not may depend on the probability that the condition is satisfied, which may be data-dependent and can be very difficult to predict at compile time.

FIG. 5A shows how this issue can be addressed. In addition to the condition code EQ, branch point information BP and target address information 'func', the conditional branch-future instruction BFCSEL may also specify a branch-bypass parameter 'end' which is indicative of an address of a branch-bypass instruction I2 which is the instruction following the subsequent branch instruction BEQX associated with the branch-future instruction BFCSEL. If the condition associated with the branch-future instruction BFCSEL is satisfied, the branch-future instruction decoding circuitry 122 controls the processing circuitry to store within the branch control data cache 130 branch target address data, and branch point data indicative of the predetermined instruction ADD2 just before to the point BP, in the same way as discussed above. On the other hand, if the condition associated with the branch-future instruction BFCSEL is not met, the branch-future instruction decoding circuitry 122 controls the processing circuitry to store within the branch control data cache 130 branch control data identifying the branch point BP and branch-bypass instruction. Hence, when the processing reaches the branch point BP, if the condition was failed then instead of proceeding sequentially to the next instruction BEQ, the branch control circuitry 124 triggers a branch to the branch-bypass instruction I2.

This means that regardless of whether the condition associated with a conditional branch-future instruction is satisfied, the branch instruction BEQ itself is not reached unless the branch control data is invalidated before reaching the branch point BP. Hence, there is no penalty incurred by introducing the branch future instruction BFCSEL, as the number of instruction slots associated with the branch control is still 1 regardless of whether the condition is passed or failed and regardless of whether the branch future instruction is included or not. Hence, this means the compiler can use branch future instructions without having to estimate whether including the branch future instructions would be likely to introduce a performance penalty, and therefore makes utilisation of the branch future instruction more likely so that the performance benefits of reducing the branch delay at the branch point can be achieved more often when executing program code in practice.

The branch-bypass parameter 'end' can be encoded in various ways within the conditional branch instruction, or may be implicit and so may not need to be encoded at all. For example, the 'end' address could be specified in a register or as an immediate value, and could be specified as an absolute value or specified relative to the program counter address of the branch future instruction itself BFCSEL. However, in practice, as the branch-bypass instruction I2 will typically follow only a few instructions on from the branch point BP, it can be more efficient to encode the branch-bypass parameter as an address specified relative to the address of the predetermined instruction ADD2 at the branch point, to reduce the number of bits required for encoding the branch-bypass parameter. Some embodiments may permit the branch point BP to be specified an arbitrary number of instructions ahead of the branch instruction BEQ. For example, this may allow control instructions such as compare instructions for evaluating the condition associated with the branch BEQ to be bypassed when branching from the branch point as well as the branch itself. In this case, the branch-bypass parameter could be a binary numeric value specifying the offset of the branch-bypass instruction relative to the predetermined instruction at the branch point in multiples of some address stride value (e.g. 2 or 4 bytes).

However, other embodiments may assume that the branch point BP is the instruction ADD2 immediately preceding the branch BX, and that the branch bypass instruction I2 is the instruction immediately following the branch, so there is one instruction between ADD2 and I2. If all branch instructions have a certain fixed instruction length, then the offset between the addresses of the instruction ADD2 at the branch point BP and the branch-bypass instruction I2 may be separated by a certain known offset, and so there may be no need to encode the branch-bypass parameter 'end' in the branch future instruction at all.

On the other hand, even if it is assumed that the branch instruction BX is the only instruction separating the branch-bypass instruction I2 from the instruction ADD2 at the branch point BP, some implementations may support variable instruction length and so the intervening branch instruction BEQ could have one of a number of instruction lengths. In this case, the bypass parameter 'end' in the conditional branch future instruction BFCSEL could identify the branch-bypass instruction by specifying the length of the subsequent branch instruction BEQ without the need to fetch and determine the length of the branch instruction BEQ, e.g. if there are two possible instruction lengths (e.g. 16 bits or 32 bits) for the branch instruction then the bypass parameter 'end' could be represented by a 1-bit flag.

FIG. 5B shows another example sequence of instructions showing use of a pair of branch future instructions BFCSEL corresponding to opposite conditions. It is relatively common for a program to require a 'fork' in the program flow requiring a branch to a first piece of code if a condition is satisfied and to a second piece of code if the condition is not satisfied (e.g. for handling if-then-else constructs). Hence, the program instruction sequence may include a pair of branch instructions BEQ and BNQ corresponding to opposite conditions (e.g. equal EQ and not equal NE). To reduce delays on handling the branches, corresponding conditional branch future instructions BFCSEL may be included with opposite conditions EQ and NE respectively. Hence, regardless of whether the EQ or NE condition is satisfied, one of the branches to 'func1' or 'func2' should be taken.

If the first of the pair of branch future instructions BFCSEL EQ fails its condition, the branch-future instruction decoding circuitry 122 controls the processing circuitry to store within the branch control data cache 130 branch control data which specifies the branch-bypass instruction at bypass address 'end' as discussed above. The second branch future instruction BFCSEL NE will then pass its condition, and so instead of branching to 'end' on reaching the first branch point BP, the required program flow actually requires branching to function 'func2' at the branch point BP. Hence, if a branch future instruction passes its condition when the branch control data cache 130 already contains valid branch control data set in response to an earlier branch future instruction, the branch-future instruction decoder circuitry 122 controls the processing circuitry to overwrite the previously set branch control data.

However, if the first of the pair of branch future instructions BFCSEL EQ passes its condition, data is stored to the branch control data cache 130 to control branching to the branch target address 'func1' when processing reaches the branch point BP. However, the second of the pair of branch future instructions BFCSEL NE will fail its condition and would ordinarily set the data in the branch control data cache 130 to indicate a branch to the branch-bypass address 'end' at the branch point BP. However, overwriting the previously set branch control data would in this case lead to the wrong result as branching to instruction I2 at address 'end' following the branch point BP would result in neither of the two functions 'func1' and 'func2' being executed. To prevent this, if a branch future instruction fails its condition when the branch control data cache 130 already contains valid branch control data set in response to an earlier branch future instruction, the branch-future instruction decoder circuitry 122 controls the processing circuitry to retain the previously set branch control data in the branch control data cache 130.

In summary, a 'condition true' branch future instruction overwrites valid branch control data set in response to a previous branch future instruction, but a 'condition false' branch future instruction does not overwrite valid branch control data set in response to a previous branch future instruction. This ensures that branch future instructions can be used correctly even when a 'fork' in the program flow control is required where the program branches to one of two alternative functions depending on the outcome of a condition.

FIG. 6 schematically illustrates zero-overhead program loop behaviour. It will be appreciated that zero-overhead program loop behaviour does not mean there is no overhead associated with supporting loop behaviour, but rather that this overhead is reduced, such as, for example, by requiring loop control program instructions to occupy slots within a program execution pipeline during the first pass through the program loop body with subsequent passes being controlled without a requirement to separately execute those loop control program instructions.

Program flow normally progresses linearly until a program branch is encountered. In the example illustrated in FIG. 6 program flow progresses past instruction Ix to reach a loop start instruction DLS[P]. This loop start instruction DLS[P] may exhibit both predicated and non-predicated behaviour. If the program loop body comprising instructions I0, I1, I2, I3 following the loop-start instruction DLS[P] is to execute as a vector program loop body in which multiple vector elements are processed for each pass through the program loop body, then the loop-start instruction will specify a vector element size to be used for predication. When this vector element size to be used is less than the maximum data path width of the underlying processing system, then this indicates that multiple vector elements are to be processed on each pass through the program loop body. Conversely, if the vector element size specified is equal to the maximum data path width, or no data element size is specified, then this indicates that processing is to be pursued in a scalar manner whereby one element is processed for each pass through the program loop body. When processing a plurality of vector elements during one pass through the program loop body, such a pass can be considers to correspond to having executed the program loop body for a plurality of iterations given by the number of vector elements processed during that pass through the program loop body. For example, a program to be executed may require eight elements to be processed, i.e. eight iterations of the program loop body. This could be achieved by two passes through the program loop body each executing the desired processing upon four of the elements in parallel with each pass through the program loop body corresponding to four iterations of the loop. In other embodiments, the elements may be separately processed during eight passes through the loop each corresponding to one iteration.

It will be appreciated that in typical vector implementations performance increase is achieved by processing the vector elements in parallel during a pass through the program loop body. However, some embodiments may sacrifice the ability to execute in parallel for a reduction in hardware overhead/complexity by executing the different vector elements in sequence even though they appear, from the programmer's point of view, to correspond to a single parallel vector processing instruction.

In the case of vector processing with a plurality of vector elements, the different vector elements are processed in different lanes of vector processing, and each of these lanes may be subject to predication. At one level the predication may be used to match the processing performed to the number of vector elements to be processed during each pass through the program loop body given the available number of data lanes available for the element bit-width concerned. For example, if the processing is to be performed upon seven vector elements and the vector element size is such that four vector elements may be processed during each pass through the program loop body, then the overall processing may be achieved by performing one pass through the program loop body in which four vector elements are processed in parallel followed by a final pass through the loop body in which three elements are processed in parallel and one lane of the vector processing is suppressed in its operation due to the predication of the program instructions within the program loop body.

Such predication matches the numbers of iterations through the program loop body with the data path width of the processing and the vector element size. Such predication may be added to by further predication which serves to suppress processing within the processing lanes during given pass through the program loop body for other reasons related to the computation being performed, e.g. as specified by the program instructions. Both of these forms of predication may be combined to provide an overall predication of the vector elements as they pass through the execution of the program loop body.

Returning to FIG. 6, the loop-start instruction has a parameter associated therewith that specifies the number of times the program loop body is to be executed (corresponding to the number of scalar loop iterations if no vectorisation is performed) as indicated by a value stored within a register Rn, which is copied by the DLS(P) instruction to the register LR. The register LR may be a register which is also used as a link register to store a return address to be used upon program call return and accordingly it may be desirable to save the contents of this link register to the program stack before executing the DLS(P) instruction. The loop-start instruction DLS(P) also has an associated parameter "loopend" indicating the program address of the end of the zero-overhead loop and is the instruction immediately following a loop-end instruction DLE.

Following the loop-start instruction DLS(P) there are found one or more program instructions, e.g. I0, I1, I2, I3, which form the program loop body. It will be appreciated that the program loop body could be short and simple or long and complex (e.g. may contain further loops or branches) and may in some circumstances only comprise a single instruction. In practice, short program loop bodies benefit proportionally more from the use of zero-overhead loops as the overhead of executing conventional loop control instructions on each pass through a program loop body is greater if the program loop body is itself shorter in length.

At the end of the program loop body there is a loop-end instruction DLE. This loop end instruction DLE takes as parameters for controlling its behaviour a loopstart parameter specifying the memory address of the instruction after the loop-start instruction DLS[P]. The DLE instruction checks the value stored in the register LR, which is indicative of the number of iterations remaining to be performed. When the final pass through the program loop body has been performed, processing proceeds to execute the program instruction following the loop-end instruction DLE, namely the instruction Iz. This may be done by directly branching to the instruction Iz, or by first executing the DLE instruction as a NOP and then executing Iz.

The right hand portion of FIG. 6 schematically illustrates which instructions are executed during which passes through the program loop body. On a first pass through the program loop body, both the loop-start instruction DLS[P] and the loop-end instruction DLE are executed. Having executed both the loop-start instruction and the loop-end instruction, loop control data is set up and stored by the system hardware. This allows subsequent passes through the program loop body to be performed without having to separately execute the loop-start instruction DLS [P] or the loop-end instruction DLE when such looping behaviour is allowed to proceed uninterrupted. This is indicated in the right hand portion of FIG. 6 by the solid lines tracing out the program instructions executed and the dotted lines indicating jumps/branches of program flow. As illustrated, at the end of the final pass through the program loop body, the program execution point may jump from the final instruction I3 of the program loop body to the instruction Iz following the loop-end instruction without executing the loop-end instruction DLE. In other embodiments, the program flow may pass through the loop-end instruction DLE with its action merely being suppressed as by that point the link register LR is storing a value indicating that all of the required iterations of the program loop body have been performed.

The location of the loop-end instruction DLE at the end of the program loop body, and its action in setting up and storing the loop control data, has the result that if the passes through the program loop body are interrupted and the loop control data invalidated such as due to occurrence of an exception, then when the processing by the program loop body is resumed, the loop-end instruction DLE may be executed again to restore the necessary loop control data. More particularly, the loop control data (microarchitectural state) need not be preserved upon occurrence of an exception, but the link register value LR (architectural state) will be maintained indicating how many of iterations of the program loop body have been performed. When execution resumes partway through the program loop body, then the loop-end instruction will be executed again (even though its execution would have been suppressed if the interrupt had not occurred) and will serve to restore the loop control data such that, upon subsequent passes through the program loop body, the zero-overhead loop behaviour is resumed and the execution of the loop-end instruction may be avoided on such subsequent passes.

As mentioned above, the loop control data which controls the zero-overhead loop behaviour may be invalided upon occurrence of an exception/interrupt during zero-overhead loop processing. Other events may also trigger the invalidation of the loop control data with that loop control data then being restored, in at least some instances, when the processing is resumed. Examples of events which can result in invalidation of the loop control data include: the processing circuitry is reset; the loop control circuitry or the loop end instruction identifying that no further iterations of the program loop body are required; an exception being entered; exception tail-chaining whereby processing proceeds directly from processing a current exception to processing a next exception without restoring state prior to the current exception; execution of a branch instruction with greater than a predetermined immediate target address range; returning from an exception; execution of instruction causing an instruction cache of the apparatus to be invalidated; execution of an instruction that disables caching of the loop control data; execution of an instruction that disables a branch predictor or branch prediction (a modified branch predictor may be used in part to fulfil the role of the loop control circuitry); the processing circuitry determining that the branch within the program loop body targets an address that is not between the beginning instruction of the program loop body and the loop end instruction; a switch between a secure mode of operation and a non-secure mode of operation; and one or more implementation defined conditions that a particular implementation may use to invalidate the loop control data.

FIG. 7 schematically illustrates the contents of various processing stages of a processing pipeline when performing the example zero-overhead program loop behaviour illustrated in FIG. 6. In this example the processing pipeline contains six stages, namely fetch, decode, and execute. The program instructions illustrated in FIG. 6 are supplied/fetched to this processing pipeline. As illustrated, the first pass through the program loop body includes execution of both the loop-start instruction DLS[P] and the loop-end instruction DLE. Thus, there are six instructions (DLS(P), I0, I1, I2, I3 and DLE) executed on the first pass. On the subsequent three passes through the program loop body execution of the loop-start instruction DLS[P] and the loop-end instruction DLE are not required and instead the loop control circuitry operating under control of the loop control data may be used to track the number of passes through the program loop body that have been performed, identify when the last instruction within the program loop body has been placed into the fetch stage and to identify the branch point to be used when branching back to the beginning instruction of the program loop body. In this example, the instruction I0 is the beginning instruction of the program loop body and the instruction I3 is the last/final instruction within the program loop body. Upon each of the zero-overhead passes through the program loop four program instructions (I0, I1, I2 and I3) flow through the processing pipeline. After execution of the final instruction I3 on the fourth pass through the program loop body, the loop iteration counter stored within the link register LR indicates that all the required iterations have been performed and accordingly when the final instruction I3 is reached, the loop control circuitry will not trigger a branch back to the beginning instruction I0, but instead will trigger a branch to the instruction Iz immediately following the loop-end instruction DLE. In other embodiments the loop control circuitry does not trigger a branch to the instruction Iz, but instead allows program flow to continue to the DLE. Since the iteration counter stored is the link register LR will indicate no more iteration are required the DLE instruction won't perform any operations and program flow will continue on the instruction Iz. This approach may be easier to implement in some embodiments, and since only one more DLE instruction is executed when the end of the loop is reached the performance impact may be minimal.

FIG. 8 schematically illustrates the form and operation of one example of loop/branch control circuitry 1000 in association with a fetch stage 1002 of an instruction pipeline. The loop/branch control circuitry is at least partially controlled by loop/branch control data stored within a loop/branch control cache 1004. It will be appreciated that the zero overhead loop behaviour and branch future behaviour described elsewhere may be controlled using the same or similar circuitry. For example, branch future behaviour may be supported using the loop control data (or data similar thereto) and the loop/branch control circuitry 1000 when the system is in a state where a DoLoop flag (which indicates that zero-overhead looping behaviour is active) is not set and yet the loop/branch control data is marked as valid.

Returning to FIG. 8 and its use in controlling zero overhead loop behaviour, the loop control cache 1004 is loaded with loop control data as a consequence of the loop end instructions DLE. The loop-end instructions are decoded by loop-end decoding circuitry 123 illustrated in FIG. 1. Data can also be loaded into this cache 1004 by the execution of branch future instructions BF, which is decoded with the branch-future instruction decoding circuitry 122 illustrated in FIG. 1.

The loop control cache 1004 may in some embodiments reuse storage which also serves as a fault syndrome register or registers to store fault syndrome data upon occurrence of faults. Such registers may have at least one valid bit fv associated therewith indicating whether any data stored therein is valid fault syndrome data. The loop/branch control circuitry 1000 and the action of the loop-start and loop-end instructions may serve to set such fault register valid bits fv associated with the fault syndrome data to an invalid state when the registers concerned are instead storing loop control data or branch future data. In some embodiments it may be that the preservation of fault syndrome data is considered more significant that allowing zero-overhead loop behaviour to proceed and accordingly if any of the false syndrome registers is storing fault syndrome data as indicated by the fault register valid bit fv, then the decoding of a loop end instruction does not permit such valid fault syndrome data to be overwritten and the zero-overhead loop behaviour will be suppressed (although the presence of the loop start and loop end instructions will still ensure that the correct number of program loop body iterations are performed by their explicit execution).

The loop control circuitry 1000 also generates a trace output to be used to form trace data for diagnostics/analysis purposes. The loop control circuitry generates a trace output corresponding to execution of a loop-end instruction DLE upon execution of such an instruction or upon control of branching back to the beginning instruction under the control of the loop/branch control circuitry 1000 when executing a zero-overhead loop even though execution of the loop-end instruction has been avoided and has not explicitly (separately) taken place during the zero-overhead loop operation subsequent to the first pass through the program loop body. Providing trace output which includes trace data indicative of events corresponding to loop-end instruction execution even though that loop-end instruction has not been explicitly/separately executed in the conventional sense makes the trace output easier to follow and understand when performing diagnostic and analysis operations.

The loop control data stored within the loop control cache 1004 can have a variety of forms and include different types of data used to control the zero-overhead loop behaviour and the branch future behaviour. In particular, the loop control data may, for example, include one or more of: loop start data indicative of an address of the beginning instruction (indicating this address directly or via an address with a predetermined offset from the address to the beginning instruction); a loop start offset address that is indicative of a distance between the last instruction of the program loop body that immediately proceeds to the loop-end instruction and the beginning instruction of the program loop body; loop end data indicative of an address of a last instruction of the program loop body that immediately proceeds to the loop-end instruction; loop remaining instruction data indicative of the number of instructions remaining to be processed before a last instruction of the program loop body that immediately proceeds to the loop-end instruction is reached; loop remaining size data indicative of the number of program storage memory locations storing program instructions remaining to be processed before a last instruction of the program loop body that immediately proceeds the loop-end instruction is reached; and loop control valid data v indicating that the loop control data is valid, e.g. an invalidation event as previously described has not occurred.

In some example embodiments, the loop control cache 1004 may contain multiple entries, so that multiple operations can be simultaneously supported. Each of these entries within the loop control cache 1004 further has a valid bit v associated with it indicating whether or not it is currently storing valid loop control data. This valid bit v for the loop control data may be cleared to indicate invalidity upon occurrence of one of the various invalidation events described above. In this example embodiment, the loop control cache 1004 is illustrated as having two entries. This permits both zero-overhead loop and branch future behaviour to be simultaneously supported. In other embodiments, storage sufficient for only a single entry may be provided within the loop control cache 1004 and accordingly only one of either zero-overhead loop behaviour or branch future behaviour may be supported at a given time. It will be appreciated that the loop control cache 1004 also serves as a branch control cache. The same dual function is also provided by the loop control circuitry 1000.

As illustrated in FIG. 8, the loop control circuitry 1000 serves to monitor the memory addresses associated with program instructions I loaded into the fetch stage 1002 from an instruction cache 1006. When the address of the program instruction loaded matches (or has a predetermined relationship, e.g. predetermined offset from) the address of the program instruction indicated as the last instruction within the program loop body of a zero-overhead loop by the loop control data stored within the loop control cache 104, the loop control circuitry 1000 determines whether or not there are remaining passes to be performed by the system through the program loop body (as indicated by the value within the link register LR) and, if there are such remaining passes, then triggers a branch to the beginning instruction of the program loop body. In this way, the loop control circuitry 1000, acting under control of the loop control data stored within the loop control cache 1004, is able to determine if further loop iterations are required, and, if further loop iterations (a pass through the program loop body for a given element to be processed) are required, then to control the processing circuitry (the instruction pipeline and the other elements of the system which perform the instructions executed by the processing pipeline) to perform the processing operation(s) specified by the program instructions or the program loop body preceding the loop end instruction, but excluding the loop end instruction (which does not itself need to be separately executed upon passes through the program loop body other than the first pass, subject to an invalidation event of the loop control data having not arisen).

FIG. 9 schematically illustrates how one example form of the loop control circuitry 1000 may use a portion of the loop control data to compare with data dependant upon a current program counter value associated the next instruction to be fetched by the fetch stage 1002 (may not be the instruction memory address itself, e.g. may have a fixed offset therefrom) to determine if a branch to the beginning instruction of the program loop body is required. More particularly, the loop control data may include a proper subset of bits indicative of a memory storage address of the loop-end instruction. For example, the loop control data may include a field of bits extending from bit 2 to bit x of a normal 32-bit, byte addressed memory address corresponding to a memory storage location. This is compared with the corresponding bit positions within a memory address associated with the next instruction to be fetched supplied by the fetch stage 1002. The program instructions in this example embodiment are the 32-bit program instructions, which are aligned within the byte addressed memory address space such that the least two significant bits 1:0 are invariant, and accordingly need not be subject to the comparison to identify the requirement to branch to the loop start address. It will be appreciated that the example of FIG. 9 is only one way in which the loop control circuitry 1000 may identify the last instruction within the program loop body being fetched into the fetch stage 1002 and accordingly the requirement to branch to the loop start address, i.e. to the beginning instruction of the program loop body. This requirement to perform a branch may be achieved in further ways, such as counting the number of instructions fetched as progress is made through the program loop body, counting the number of storage locations passed through in fetching the instruction of the program loop body (this technique may be suitable for use in embodiments employing variable length instructions), or other techniques.

FIG. 10A is a flow diagram schematically illustrating behaviour upon the decoding of a loop-start instruction. At step 2000 processing waits until a loop-start instruction DLS(P) is decoded by a loop-start instruction decoder circuitry. Step 2002 determines whether or not the iteration count stored within the register specified by the parameter Rn is equal to zero. If the iteration count is equal to zero, then this indicates that no passes (iteration) are required through the program loop body and processing proceeds to step 2004 at which either a branch to the instruction following the loop-end instruction DLE is performed or the program loop body is traversed with suppression of each of the instructions encountered, such as by suppressing write backs and other side effects from those instructions.

If the determination at step 2002 is that the iteration count is not zero, then processing proceeds to step 2003 at which a determination is made as to whether the instruction decoded at step 2000 is a predicated loop start instruction DLSP. If yes, then processing proceeds directly to the step 2006. If no, then step 2005 sets the element size to the full vector size before processing again proceeds to step 2006 at which a value Nmax is generated indicating a maximum number of vector elements that can be processed in one pass through the program loop body In other embodiments the calculation of Nmax need not be done as part of the DLS(P) instruction, e.g. it could be done as part of instruction processing within the DoLoop as illustrated in FIG. 13. This value Nmax is dependant upon the data width of the processing circuitry of the processing pipeline compared to a vector element size specified by the loop-start instruction. The Nmax value is static throughout execution of the zero-overhead loop behaviour and so the value generated need not be explicitly stored but merely be used to control the vector behaviour as and when required.

Step 2008 serves to set a flag indicating that the DoLoop state is valid and the system is currently processing a DoLoop (i.e zero-overhead loop behaviour is active), the loop iteration count is also copied to the link register LR, where it will be used by the loop control circuitry. Processing then proceeds to step 2010 at which an advance is made to fetching and executing the beginning instruction of a program loop body.

FIG. 10B schematically illustrates a loop-start instruction DLS(P). This includes an opcode field ENC identifying the instruction as a DLS(P) instruction. Parameter Fields are also included specifying a register containing the iteration count $R_n$ (to be transferred to the link register LR), an indicator of where the loop-end instruction is located (may be specified in various ways as for the BF specifying the branch target addresses previously described), and an element size value. If the element size value is set to the full vector size of the data path, then the instruction will be treated as non-predicated, i.e. a DLS instruction. If the element size is less than this indicates the loop should be vectorised using elements of the specified vector size and processed as a predicated loop-start instruction.

The vector element size $VE_{width}$ is stored within a floating point control data register that is accessible when floating point data values are accessible and is inaccessible when floating point data values are inaccessible. When the floating point data values are accessible, vector element size $VE_{width}$ as decoded from the loop-start instructions is stored within the floating point control data register and controls vectorisation within the data path. If the loop-start instructions is non-predicated, then the vector element size is set to the vector register width $VR_{width}$.

When floating point data values are not accessible, e.g. floating point state has not been initialised, an attempt to read $VE_{width}$ from the floating point control data register returns a value of $VR_{width}$ independent of any value of $VE_{width}$ currently stored within the floating point control register (also inaccessible). If the floating point values are made accessible (initialised) part way through execution of a loop, then any existing floating state will be saved (e.g. by a lazy state saving mechanism) and a new floating point state will be initialised including intialising the value of $VE_{width}$ stored within the floating point control data register to $VR_{width}$ (hardwired for a particular implementation). The vectorisation within the loop will accordingly be unchanged.

FIG. 11 is a flow diagram schematically illustrating actions upon decoding of a loop-end instruction DLE. At step 2012 processing waits until a loop-end instruction DLE is decoded by a loop-end instruction decoder. Step 2014 then determines whether or not the DoLoop flag is currently set. If the DoLoop flag is not currently set, then this indicates that zero-loop behaviour is not currently active and processing proceeds to step 2016 at which execution of the loop-end instruction is suppressed, such as by treating it as a no-operation instruction (NOP) at step 2013.

If the determination at step 2014 is that the DoLoop flag is set, then step 2018 serves to store loop control data into the loop control cache 1004. This loop control data may include, for example, data indicative of the instruction address of the beginning instruction, a field of least significant bits (excluding any invariant bits due to fixed instruction alignment) corresponding to the bits of the memory storage address of the DLE instruction and a valid bit indicating that the loop control data is valid. Other forms of loop control data may also be stored as previously described.

Step 2020 determines whether or not the current iteration count is less than or equal to the Nmax value previously generated in response to the DLS(P) loop-start instruction. If the iteration count is less than or equal to the Nmax value, then this indicates that a current pass through the program loop body which has reached the loop-end instruction is the last required pass through the program loop body and accordingly processing proceeds to step 2016. If the determination at step 2020 is that the iteration count is not less than or equal to the Nmax value, then processing proceeds to step 2022 at which the iteration count is decremented by Nmax.

Step 2024 then performs a branch to the beginning instruction of the program loop body.

FIG. 12 is a flow diagram schematically illustrating the action of the loop control circuitry 1000. At step 2026 the loop control circuitry 1000 determines whether or not the loop control data is currently marked as valid. If the loop control data is currently marked as valid, then processing proceeds to step 2028 where a determination is made as to whether or not the latest instruction supplied to the pipeline (i.e. fetched to the fetch stage 1002) is the last instruction within the program loop body as indicated by the address of the next instruction to be fetch matching the loop control data. If fetching of such a last instruction in the program loop body is detected, then processing proceeds to step 2030 at which a determination is made as to whether or not the iteration count is currently less than or equal to the value Nmax. If the iteration count is less than or equal to the value of Nmax, then processing proceeds to step 2032 at which the DoLoop flag is cleared and the loop control data valid bit v is cleared. This indicates that zero-overhead loop behaviour is finished. Processing by the loop control circuitry 1000 then finishes for that zero-overhead loop behaviour instance. The loop-end instruction will then be processed as discussed in relation to FIG. 11, e.g. a branch around such a loop-end instruction DLE made.

If the determination at step 2030 is that the current iteration count, which tracks the number of passes through the program loop body, is not less than or equal to the value Nmax, then step 2034 serves to decrement the iteration count by Nmax. Step 2036 then branches to the beginning instruction of the program loop body and the next pass through the program loop body is initiated.

FIG. 13 is a flow diagram schematically illustrating the control of execution of instructions within a zero-overhead program loop body and, in particular, how this may involve predication. Step 2038 determines whether there is an instruction to execute. Step 2040 then determines whether the DoLoop flag is set indicating that such execution is taking place within a zero-overhead loop program loop body. If the DoLoop flag is not set, then processing of the instruction proceeds normally at step 2050. If the determination at step 2040 is that the DoLoop flag is set, then step 2042 determines whether the value of Nmax is greater than the remaining iteration count. If the value of Nmax is not greater than the remaining iteration count, then step 2044 sets the number of active lanes to be used for the program instruction to be executed as Nmax. This number of active lanes may in practice may be reduced a consequence as further predication which may be encoded within the instruction to be executed at step 2048 or a previous instruction performed in either steps 2048 or 2050. If the determination at step 2042 is that value of Nmax is greater than the remaining iteration count, then step 2046 sets the number of active lanes to be used for the instruction as the remaining iteration count value. This avoids the active use of lanes of processing when there are not vector elements needing to be processed within such lanes. Step 2048 then performs the instruction identified as requiring execution at step 2038 using the set number of active lanes.

A vectorised performance of the instruction may have dependence upon the type of the instruction being performed. More particularly, the manner in which the predication indicated by the number of active lanes selected is achieved may vary depending on the nature of the instruction being executed and the nature of the data path of the system concerned. For example predication may be applied by suppressing write back for data lanes (e.g. byte enables) which have been indicated by the predication of data as not required. In such a case the element size applied when generating the predication value may be different from the element size applied by the processing instruction. Thus suppressing the write back at a smaller element size may result in only parts of a single arithmetic operation such as an addition being written back. In the cases of instructions which can not be readily split, then the predication applied may be specified at a byte level, but is implemented in dependence upon only one of the byte predication values, such as the least significant byte serving to predicate the whole of a word of data processing performed.

As discussed above, the loop control circuitry 1000 may control updating of the loop counter in dependence on a control parameter stored in a predetermined state register which is indicative of a number of vector elements to be processed in response to one vector instruction of the program loop body. For example the control parameter may be $VE_{width}$ which indicates the size of one vector element processed by the loop, which allows the number of elements to be processed per loop iteration to be determined, so that the loop counter can be updated on each iteration by a number of vector elements processed by the traverse of the loop body. Note that $VE_{width}$ is the size of one vector element as defined for processing of the loop. A separate vector element size $IVE_{width}$ may also be specified as one of the parameters of the vector instructions within the loop, which would often match $VE_{width}$ as specified for the loop as a whole, but does not need to be the same. Allowing separate element sizes to be specified for the loop as a whole and instructions within the loop can be useful to support cases where one "element" to be processed in the loop actually contains multiple components which are allocated to different vector elements of a vector instruction. For example, a complex number may have real and imaginary components, and complex arithmetic vector instructions may be supported which assume that the real and imaginary components of one or more numbers are allocated to alternating elements of the vector. In this case, even if the individual vector instructions specify 32-bit elements, for example, the loop as a whole may consider one "element" to have 64 bits as it comprises both the real and imaginary components. Hence, the references to $VE_{width}$ herein refer to the vector element size as seen by the loop control circuitry, which is not necessarily the same as the actual element size used by vector instructions within the loop.

The loop tail predication to mask (Nmax-loopcount) vector lanes on the final iteration of the loop may also depend on parameters stored in the predetermined state register. For example, the loop tail predication may depend on a flag indicating whether predication is required, and when predication is required, the number of active lanes to be performed on the final iteration is derivable from $VE_{width}$ stored in the predetermined state register (in combination with the loop counter "loopcount" stored in the link register). At the end of the loop, any loop tail predication being applied can be disabled by resetting the flag in the predetermined state register so that vector instructions subsequent to the loop will operate without tail predication. Alternatively, whether predication is required could be determined directly from the loopcount and $VE_{width}$, so that no explicit predication flag may be needed. Here, loop tail predication refers to the functionality where, when $N_{ve}/N_{max}$ does not equal a whole number, where $N_{ve}$ is a total number of vector elements (of size $VE_{width}$) to be processed during a number of iterations of the program loop body and $N_{max}$ is a maximum number of vector elements (again of size $VE_{width}$) to be processed in one iteration of the program loop body, the loop control circuitry 1000 at least partially suppresses processing in one or more of said vector processing lanes during one of more of said iterations such that a total number of vector elements processed during said iterations is $N_{ve}$. Although the examples below describe cases where the loop tail predication is applied to the final loop iteration, other implementations could also apply the loop tail predication in an earlier loop iteration to give the same outcome. Note that the predication of one element of size $VE_{width}$ may require more than one element of size $IVE_{width}$ to be masked for an individual vector instruction within the loop in cases where $VE_{width} > IVE_{width}$ as discussed above.

However, the predetermined state register may be a register which is not always accessible. For example, the predetermined state register may be a register associated with floating point context data, e.g. a floating point control register 1110 (see FIG. 8) which is one of the floating point registers 110 shown in FIG. 1. To reduce the amount of state that needs to be saved on a context switch, processes which do not require floating point operations are not allocated floating point state by default, and a floating point state accessibility flag (or lazy state saving status flag) stored in a control register may indicate whether the floating point context is accessible to the current process. On a context switch, if the state accessibility flag indicates that the floating point context is not currently accessible, the floating point context does not need to be saved to memory. In response to an instruction requiring the floating-point context when the floating point context is not currently accessible, a lazy state saving operation is performed to save any previous context data stored in the floating point registers to memory, and then the floating point context registers are made accessible to the current process and the state accessibility flag updated to indicate that the floating point context is now accessible.

Another situation in which the predetermined state register may be inaccessible is if access permissions have been defined which prohibit the current privilege level or process from accessing that register. For example, some systems may provide permissions checking circuitry 1008 (see FIG. 8) to check access permission data for controlling access to a particular subset of registers including the predetermined state register (e.g. the floating point registers), and to trigger a fault condition when an access to one of the subset of registers violating said access permission data is detected. The fault may trigger an operating system to review the access permissions and if necessary save privileged data currently stored in the registers to memory so that it can be hidden from the unprivileged process that triggered the fault, before changing the access permissions to make the subset of registers accessible to the process/privilege level that triggered the fault, and returning processing to the unprivileged process.

Even if the floating point context is made accessible at the start of the loop for setting up the required vector element width $VE_{width}$, it cannot be assumed that the floating point context will still be accessible at the end of the loop, since it is possible an exception may have occurred during the loop which led to the current process's context being invalidated, and upon restoration of that process's context following the exception, the floating point context would not be restored until it is actually needed by an instruction associated with the restored process.

Hence, at the end of the loop, the predetermined state register storing the parameter used for controlling the loop count decrementing and/or the loop tail predication may not be accessible. To be able to reset the loop tail predication information one would expect to provide the functionality for triggering lazy state saving or a fault condition at the end of the loop to allow the predetermined state register to be made accessible. However, this approach can be problematic because triggering lazy state saving operations or a fault condition from the loop control circuitry 1000 without being triggered by an instruction would often be undesirable as the architectural mechanisms for handling faults or state saving may assume that these operations are triggered at a particular instruction address. To improve performance it may be preferred to omit execution of the loop-end instruction altogether on the final iteration of the loop (so that in response to detecting that no further loop iterations are required when the loop control data is valid, the loop control circuitry is configured to control the processing circuitry to continue program execution from an instruction after said loop-end instruction). It may not be appropriate to trigger the fault condition or state saving in response to the instruction preceding or following the loop-end instruction. Hence, there may not be an appropriate instruction at the end of the loop for triggering the lazy state saving or fault condition for making the floating point context accessible when required. Also, the loop control circuitry 1000 may be associated with the fetch stage of an instruction pipeline, which would not normally have paths for triggering register accesses, so it would be difficult and expensive in terms of circuit area to allow the fetch stage to trigger state saving.

These issues can be addressed by instead triggering the lazy state saving operation or fault condition in response to the loop end instruction, which would be executed on the very first iteration of the loop or at the end of an iteration in which an exception occurred (as the exception would invalidate the loop control data, the loop-end instruction would be re-executed at the end of that iteration). Hence, in response to the loop-end instruction when a subset of registers including the predetermined state register is inaccessible, the loop-end instruction decoding circuitry may generate state saving control signals to trigger saving to memory of state data stored in said subset of registers and to make said subset of registers accessible. By triggering the state saving operation in response to the loop-end instruction rather than on completion of the loop, it is not necessary to execute the loop-end instruction at the end of the final loop iteration merely as a precaution in case the floating-point state has become inaccessible, allowing performance to be improved. Similarly, in case the access permission data prohibits access to a subset of registers including the predetermined state register, in response to the loop-end instruction the loop-end instruction decoding circuitry may generate control signals to trigger an access to the subset of registers. Hence, if access is not currently permitted by the permissions checking circuitry 1008, a fault will be generated at the time of executing the loop end instruction, allowing the operating system to step in to grant the necessary permissions once any sensitive data has been saved to memory and invalidated in that subset of registers. These operations in response to the loop-end instruction also ensure that the loop control circuitry 1000 can access the VEwidth parameter for controlling decrementing of the loop counter.

At the end of the final iteration of the loop, in response to detecting that no further loop iterations are required following an iteration of the program loop body, the loop control circuitry disables suppression of processing in said one or more of said vector processing lanes. For example, the loop control circuitry may control the suppression of processing in one or more of said vector processing lanes in dependence on a control parameter stored in a predetermined state register, and in response to detecting that no further loop iterations are required following an iteration of the program loop body, the loop control circuitry 1000 may determine whether the predetermined state register is accessible, and when the predetermined state register is determined to be accessible, to generate predication disabling control signals for disabling the suppression of processing in the one or more of said vector processing lanes by updating the control parameter stored in the predetermined state register. The loop control circuitry 1000 suppresses generation of the predication disabling control signals when the predetermined state register is determined to be inaccessible.

That is, the loop control circuitry 1000 only resets the parameter in the predetermined state register to disable loop tail predication when the predetermined state register is already accessible. When the predetermined state register is not already accessible, the loop end instruction will be encountered as events which could lead to the register becoming inaccessible (e.g. an exception, fault, or context switch) will also invalidate the loop control data from the loop control cache 1004. Hence, there is no need for the loop control circuitry 1000 to trigger the lazy state saving or fault triggering operations—if required at the end of the loop this will instead be triggered by the loop-end instruction decoding circuitry 123 in response to the loop-end instruction.

For the reasons given above, it is useful for the loop-end instruction to trigger a check of whether the predetermined state register storing the control parameters specifying the element width and loop tail predication control information is accessible, and trigger a fault condition or lazy state saving if the register is inaccessible. Some implementations could always trigger such state saving or fault condition in response to a loop-end instruction when the required predetermined state register is inaccessible.

However, in practice not all loops require predication of lanes at the tail of the loop. For example, if the loop is to be processed using scalar instructions or vector instructions with element size equal to the register width, only one element is processed per iteration and so the total number of elements is always an exact multiple of the vector length. Hence, on such loops, access to $VE_{width}$ or the loop tail predication control parameter is not required. To avoid incurring the performance cost of triggering lazy state saving or a fault condition for non-predicated loops, two versions of the loop start and end instructions are provided:

DLS: non-predicated loop start instruction: specifies the loop end address 'loopend' and the number of iterations $r_N$, but not the vector element size, and so no change is made to the $VE_{width}$ parameter in the floating point control register. $VE_{width}$ is by default assumed to be equal to the number of bits in one vector register $VR_{width}$.

DLSP: predicated loop-start instruction: specifies the loop end address 'loopend' and the number of iterations $r_N$, and also specifies a 'size' parameter indicating the element width $VE_{width}$ for vector instructions. The element width is stored to the floating point control register. If the floating point context is not already accessible, the DLSP instruction triggers a lazy state saving operation to save previous floating point context to memory, and the floating point context is made accessible to the current process, before storing the element width to the floating point control register.

DLE: non-predicated loop-end instruction: used following the DLS instruction. If executed when the floating point context is inaccessible, the loop-end instruction decoding circuitry does not trigger any lazy state saving of the floating point context to memory.

DLEP: predicated loop-end instruction: used following the DLSP instruction. If executed when the floating point context is inaccessible, the loop-end instruction decoding circuitry generates control signals to trigger saving to memory of the floating point context, and makes the floating point context accessible. The DLEP instruction also triggers an access to one of the floating point context registers (e.g. the floating point control register storing $VE_{width}$) to ensure that a fault condition is triggered by the access permission checking circuitry 1008 if the floating point context is not permitted to be accessed for the current process/privilege level.

At the end of each iteration of the loop, the loop control circuitry decrements the loop counter by the number of elements processed in that iteration, which is derived from $VE_{width}$ read from the floating point control register. Hence, for non-predicated loops $VE_{width}=VR_{width}$, so the loop counter is decremented by 1 for each iteration. For predicated loops, the number of elements processed per iteration is $VR_{width}/VE_{width}$ ($VR_{width}$ may be fixed for a given hardware implementation so may not need to be indicated explicitly in a control register).

By providing two versions of the loop-end instruction, then even if an exception occurs mid-way through a predicated loop so that the context data is flushed and the floating point context becomes inaccessible to the current process again following the return from the exception, as this will also invalidate the loop control data, the predicated loop-end instruction will be executed at the end of the loop, and so can trigger the lazy state saving operation or fault condition if required to make the floating point context accessible again. However, for non-predicated loops the overhead of triggering the lazy state saving operation or fault condition can be avoided by using the non-predicated loop-end instruction. Hence, in summary the loop-end instruction decoding circuitry may select whether to generate the state saving control signals, in dependence on whether the loop-end instruction is a first type of loop-end instruction or a second type of loop-end instruction. Similarly, whether an access to the subset of registers including the predetermined state register is triggered in response to the loop-end instruction may depend on whether the loop-end instruction is the first type or second type of loop-end instruction.

FIGS. 14A to 14E show examples of execution of non-predicated and predicated loops to illustrate the features described above.

FIG. 14A shows an example of a non-predicated loop where no exception occurs during execution of the loop. The non-predicated loop-start instruction DLS is executed at the start of the loop to set up the loop end address and the number of iterations to be executed. As this is a non-predicated loop-start instruction, the element width $VE_{width}$ parameter in the floating point control register remains unchanged. If the current process does not already have access to floating point context, no access is required and so no lazy state saving operation or fault condition is triggered.

At the end of the first loop iteration, the non-predicated loop-end instruction DLE is executed to set up the loop start address for controlling subsequent iterations, and again no access to the floating point control register is required, so even if the floating-point context accessibility flag indicates that the floating point context is not currently accessible, no lazy state saving operation or fault condition is triggered. On subsequent iterations of the loop, the loop-start and loop-end instructions are not executed and program flow proceeds through multiple iterations of the program loop body. At the end of each iteration, since the floating point context is inaccessible, the loop control circuitry 1000 does not access the floating point control register and assumes that $VE_{width} = VR_{width}$, i.e. the number of elements per vector is 1, and so decrements the loop counter by 1. On the final iteration, no vector loop predication is applied, and on detecting that no further iterations are needed, the loop control circuitry 1000 controls program flow to jump from the instruction preceding the loop-end instruction DLE to the instruction after DLE, skipping the loop-end instruction and continuing processing of subsequent instructions after the loop.

FIG. 14B shows an example of a predicated loop where no exception occurs during the execution of the loop. This time the loop-start instruction is a predicated loop-start instruction DLSP and so in addition to setting up the loop control data specifying the loop end address and number of iterations to be performed, the loop-start instruction decoding circuitry also triggers updating of the vector element width $VE_{width}$ specified in the floating point control register based on a 'size' parameter specified by the DLSP instruction. Hence, if the floating point context is not already accessible, the lazy state saving operation or fault condition is triggered to make the context accessible so that $VE_{width}$ can be updated. At the end of the first loop iteration, the predicated loop-end instruction DLEP is executed to set up the loop start address. The loop-end instruction decoding circuitry detects from the state accessibility flag that the floating-point context is already accessible, so there is no need for lazy state saving, and the access to the floating point control register triggered in response to the loop end instruction DLEP does not trigger a fault. The subsequent iterations of the loop are then executed without executing the loop start/end instructions. On each iteration of the loop, the loop control circuitry 1000 determines the number of elements processed in the iteration based on $VE_{width}$ read from the floating point control register, and decrements the loop counter by the determined number of elements. On the final iteration of the loop, if the number of remaining elements to be processed as indicated by the loop counter is less than the number of elements to be processed by one vector instruction, the loop control circuitry 1000 applies predication to the unneeded vector lanes, and the portions of the vector to be masked are determined from $VE_{width}$ and the loop counter. At the end of the final iteration, the loop control circuitry 1000 detects that no further iterations are required and so the DLEP instruction is skipped. As the floating point context is already accessible, the $VE_{width}$ field in the floating point control register is reset to the width of the vector registers to disable loop tail predication for subsequent vector instructions, and no lazy state saving or fault condition is required.

FIG. 14C shows an example of a non-predicated loop when an exception occurs during the loop. The non-predicated loop-start and loop-end instructions DLS, DLE are executed in the same way as described for FIG. 14A, and the loop counter is decremented by 1 on each iteration of the loop as described for FIG. 14A. An exception occurs on the third iteration, which triggers state saving of the interrupted thread's context. If the floating point context is indicated as accessible, the state saving includes saving of floating point context, while if the floating point context is inaccessible then the state saving saves integer context data but not floating point context data. On return from the exception, the integer state data is restored and the floating point context data is initially inaccessible. A lazy state preservation flag is set to indicate that lazy state preservation is active, so that if any subsequent instruction of the loop requires floating point context data, this will trigger lazy state restoration of the floating point context. If no instructions requiring the floating point context data are encountered, then when the loop end instruction DLE is reached the floating point context will still be inaccessible. Since the loop control data was previously invalidated on occurrence of the exception, the loop end instruction DLE is executed to reset the loop control data. As this is a non-predicated loop end instruction DLE, the loop-end instruction does not trigger lazy state saving or an access to the floating point control register, even if the floating point context is inaccessible. Having restored the loop control data, the subsequent iterations of the loop continue in the same way as in FIG. 14A, and the final iteration of the loop is handled in the same way as FIG. 14A. Hence, the DLE instruction is skipped when no iterations remain to be processed, and so no lazy state preservation or fault condition is triggered on the final iteration even if the floating point context is inaccessible. If the lazy state preservation flag has not yet been cleared since returning from the exception, it remains active and so the next instruction that requires floating point context after the loop will trigger lazy state saving. Furthermore if the lazy state preservation flag has not yet been cleared since returning from the exception the loop control circuitry will not attempt to reset $VE_{width}$ in the floating point control register to the width of the vector register.

FIG. 14D shows an example of a predicated loop when an exception occurs during the loop. On the first iteration, the predicated loop start/end instructions DLSP and DLEP are executed in the same way as in FIG. 14B. An exception occurs on the third iteration of the loop. This triggers a context switch to the exception handler or another thread and back again, which is handled in the same way as in FIG. 14C. However, for the predicated loop, on return to the loop body instructions with the lazy state preservation flag (state accessibility flag) set active, the decoding of the predicated loop-end instruction DLEP triggers the lazy state saving operation (if no earlier instruction in the loop body required floating point context) and also triggers an access to the floating-point control register so that if the access permissions for the current process do not permit access to the floating point registers then a fault condition can be raised to trigger the operating system to grant the required permissions. Hence, after encountering the predicated loop-end instruction, the floating point context becomes available and so it is possible to read the $VE_{width}$ parameter for controlling updating of the loop counter and to access the loop tail predication parameter for controlling predication on the last iteration of the loop. If more than one exception occurs during the loop, each exception is handled in a similar way to the one shown in FIG. 14D. On the final loop iteration the loop tail predication is applied to control masking of unused vector lanes to ensure that the total number of elements processed in the loop matches the number specified by the loop-start instruction. At the end of the final loop iteration, the loop control circuitry 1000 detects that the lazy state saving flag is inactive and so the floating point context is already accessible, and so resets $VE_{width}$ in the floating point control register to the width of the vector registers to disable suppression of processing of those vector lanes which were predicated during the loop.

FIG. 14E shows an example of a predicated loop where the exception occurs on the final iteration of the loop. On the first iteration the loop start/end instructions DLSP and DLEP are handled in the same way as in FIG. 14B or FIG. 14D, and also the decrementing of the loop counter on each iteration is handled in the same way. However, at point *2 an exception occurs on the final iteration, which triggers a context switch. The previous floating point context (including the predication element width $VE_{width}$) is saved to memory and then the exception is processed. On returning from the exception the integer context associated with the thread running the loop is restored, but the floating point context is not restored and so the lazy state saving flag is set active. In this example, the first instruction executed after returning from the exception is a scalar instruction $SI_1$ which does not require floating point state, and so does not trigger lazy state saving. While the predication element width $VE_{width}$ in the floating-point control register is inaccessible, this does not matter as the instruction is a scalar instruction and so does not require predication. When the first vector instruction $VI_2$ is encountered at point *3, this is considered to be an instruction which requires the floating-point context (aside from requiring the predication element width $VE_{width}$ from the floating-point control register, in some architectures the vector registers may overlap with floating-point registers and so execution of a vector instruction when the lazy state saving flag is active may anyway cause lazy state preservation to occur in order to making the vector registers accessible). As the lazy state saving flag is active, the vector instruction $VI_2$ triggers the lazy state saving operation, which makes the floating-point context accessible and allows the $VE_{width}$ to be restored so that predication is re-enabled for the remainder of the final iteration of the loop.

In some embodiments the lazy state preservation process just preserves the floating point context within the registers and does not restore the floating point context associated with the thread that triggered the lazy state preservation. In such embodiments the operating system configures the access permissions so that in addition to triggering lazy state preservation, attempts to access the floating point state also trigger a fault which the operating system can respond to and restore the floating point context associated with the thread that triggered the fault.

FIG. 15 schematically illustrates a virtual machine embodiment suitable for implementing the techniques described herein in some example embodiment. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
processing circuitry to perform processing operations specified by a sequence of program instructions;
an instruction decoder to decode said sequence of program instructions to generate control signals to control said processing circuitry to perform said processing operations; wherein
said instruction decoder comprises branch-future instruction decoding circuitry to decode a branch-future instruction, said branch-future instruction having a programmable parameter associated with a branch target address and further programmable branch point data parameter indicative of a predetermined instruction following said branch-future instruction within said sequence of program instructions; and
said processing circuitry comprises branch control circuitry controlled by said branch-future instruction decoding circuitry and responsive to said branch point data to trigger a branch to processing of program instructions starting from a branch target instruction corresponding to said branch target address when processing of said sequence of program instructions reaches said predetermined instruction; wherein,
said branch point data comprises one or more of:
address data indicative of an address of said predetermined instruction;
end data indicative of an address of a last instruction that immediately precedes said predetermined instruction;
offset data indicative of a distance between said branch-future instruction and said predetermined instruction;
a proper subset of bits indicative of a memory storage address of said predetermined instruction starting from a least significant bit end of bits of said memory storage address that distinguish between starting storage addresses of instructions;
remaining size instruction data indicative of a number of instructions remaining to be processed before said predetermined instruction; and
remaining size data indicative of a number of program storage locations remaining to be processed before said predetermined instruction is reached.

2. Apparatus as claimed in claim 1, wherein
when said branch control circuitry triggers said branch, said branch target instruction follows an instruction immediately preceding said predetermined instruction in said sequence of program instructions, and an operation specified by said branch-future instruction and an operation specified by said instruction immediately preceding said predetermined instruction are performed contiguously by said processing circuitry.

3. Apparatus as claimed in claim 1, wherein said branch-future instruction decoder circuitry controls said processing circuitry to store said branch point data and said branch target address in a branch control cache.

4. Apparatus as claimed in claim 3, wherein, when said branch-future instruction decoding circuitry decodes said branch-future instruction, said branch control circuitry stores a proper subset of bits indicative of a memory storage address of said predetermined instruction starting from a least significant bit end of bits of said memory storage address that distinguish between starting storage addresses of instructions.

5. Apparatus as claimed in claim 4, wherein said branch control circuitry triggers said branch when said proper subset of bits matches one of:
   a corresponding portion of a value indicative of a program counter value;
   a corresponding portion of a value indicative of an instruction fetch address; and
   a value indicative of processing activity of said data processing apparatus.

6. Apparatus for processing data comprising:
   processing circuitry to perform processing operations specified by a sequence of program instructions;
   an instruction decoder to decode said sequence of program instructions to generate control signals to control said processing circuitry to perform said processing operations; wherein
   said instruction decoder comprises branch-future instruction decoding circuitry to decode a branch-future instruction, said branch-future instruction having a programmable parameter associated with a branch target address and further programmable branch point data parameter indicative of a predetermined instruction following said branch-future instruction within said sequence of program instructions; and
   said processing circuitry comprises branch control circuitry controlled by said branch-future instruction decoding circuitry and responsive to said branch point data to trigger a branch to processing of program instructions starting from a branch target instruction corresponding to said branch target address when processing of said sequence of program instructions reaches said predetermined instruction;
   wherein said branch-future instruction decoder circuitry controls said processing circuitry to store said branch point data and said branch target address in a branch control cache; and
   wherein in response to one or more of:
      said processing circuitry being reset;
      loop control circuitry or a loop-end instruction determining that no further iterations of a program loop body are required;
      an exception being entered;
      exception tail-chaining whereby processing proceeds directly from processing a current exception to processing a next exception without restoring state prior to said current exception;
      execution of a branch instruction with greater than a predetermined immediate target address range;
      execution of a branch instruction;
      execution of a loop-start instruction;
      returning from an exception;
      execution of an instruction that causes an instruction cache of said data processing apparatus to be invalidated;
      execution of an instruction that disables caching of said control data;
      execution of an instruction that disables branch prediction;
      said processing circuitry determining that a branch within a program loop body targets an address that is not between a loop-start instruction and a loop-end instruction;
      a switch between a secure mode of operation and a non-secure mode of operation; and
      one or more implementation defined conditions;
   said branch point data is invalidated.

7. Apparatus as claimed in claim 6, wherein, when said branch point data has been invalidated, program flow advances to said predetermined instruction.

8. Apparatus as claimed in claim 1, wherein said branch-future instruction is a conditional branch-future instruction executed in dependence upon one or more condition codes associated with said conditional branch-future instruction being met.

9. Apparatus as claimed in claim 8, wherein in response to said conditional branch-future instruction when said one or more condition codes are not met, the branch-future instruction decoding circuitry is configured to set branch control data to control said branch control circuitry to trigger a branch to processing of a branch-bypass instruction following said subsequent branch instruction in the sequence of program instructions when processing of said sequence of program instructions reaches said predetermined instruction.

10. Apparatus as claimed in claim 9, wherein said conditional branch-future instruction specifies a bypass parameter indicative of an address of said branch-bypass instruction relative to an address of said predetermined instruction.

11. Apparatus as claimed in claim 10, wherein said instruction decoder is configured to decode instructions having a variable instruction length selected from a plurality of instruction lengths supported by the instruction decoder; and
    said bypass parameter is indicative of an instruction length of said subsequent branch instruction.

12. Apparatus as claimed in claim 8, wherein in response to said conditional branch-future instruction when said one or more condition codes are met and a branch control cache already stores valid branch control data set in response to an earlier branch future instruction, said branch-future instruction decoder circuitry is configured to control said processing circuitry to overwrite said valid branch control data; and
    in response to said conditional branch-future instruction when said one or more condition codes are not met and said branch control cache already stores valid branch control data set in response to an earlier branch future instruction, said branch-future instruction decoder circuitry is configured to control said processing circuitry to retain said valid branch control data in said branch control cache.

13. Apparatus as claimed in claim 1, wherein said programmable parameter associated with a branch target address comprises a register specifier, and said branch target address is stored in a register corresponding to said register specifier.

14. Apparatus as claimed in claim 1, wherein said programmable parameter associated with a branch target address comprises an immediate offset value indicating said branch-target address by an offset from a current memory address dependent upon a memory address of said branch-future instruction.

15. Apparatus as claimed in claim 1, wherein said branch-future instruction decoder circuitry controls said processing circuitry to store within a link data store a return address for use in a return from said branch to said branch target address.

16. Apparatus as claimed in claim 1, wherein said branch control circuitry is configured to store within a link data store a return address for use in a return from said branch to said branch target address when processing of said sequence of program instructions reaches said predetermined instruction.

17. Apparatus as claimed in claim 15, wherein said link data store is one of:
a link register; or
an address in a storage area specified by a predetermined offset applied to a stack pointer register.

18. A method of processing data comprising:
performing processing operations specified by a sequence of program instructions;
decoding said sequence of program instructions to generate control signals to control said performing of said processing operations; wherein
said decoding including decoding a branch-future instruction, said branch-future instruction having programmable parameters respectively associated with a branch target address and branch point data indicative of a predetermined instruction following said branch-future instruction within said sequence of program instructions; and
triggering a branch to processing of program instructions starting from a branch target instruction corresponding to said branch target address when processing of said sequence of program instructions reaches said predetermined instruction; wherein,
said branch point data comprises one or more of:
address data indicative of an address of said predetermined instruction;
end data indicative of an address of a last instruction that immediately precedes said predetermined instruction;
offset data indicative of a distance between said branch-future instruction and said predetermined instruction;
a proper subset of bits indicative of a memory storage address of said predetermined instruction starting from a least significant bit end of bits of said memory storage address that distinguish between starting storage addresses of instructions;
remaining size instruction data indicative of a number of instructions remaining to be processed before said predetermined instruction; and
remaining size data indicative of a number of program storage locations remaining to be processed before said predetermined instruction is reached.

19. A computer program product storing in non-transitory form a computer program for controlling a computer to provide a virtual machine execution environment operating in accordance with a method of processing data comprising:
performing processing operations specified by a sequence of program instructions;
decoding said sequence of program instructions to generate control signals to control said performing of said processing operations; wherein
said decoding including decoding a branch-future instruction, said branch-future instruction having programmable parameters respectively associated with a branch target address and branch point data indicative of a predetermined instruction following said branch-future instruction within said sequence of program instructions; and
triggering a branch to processing of program instructions starting from a branch target instruction corresponding to said branch target address when processing of said sequence of program instructions reaches said predetermined instruction; wherein,
said branch point data comprises one or more of:
address data indicative of an address of said predetermined instruction;
end data indicative of an address of a last instruction that immediately precedes said predetermined instruction;
offset data indicative of a distance between said branch-future instruction and said predetermined instruction;
a proper subset of bits indicative of a memory storage address of said predetermined instruction starting from a least significant bit end of bits of said memory storage address that distinguish between starting storage addresses of instructions;
remaining size instruction data indicative of a number of instructions remaining to be processed before said predetermined instruction; and
remaining size data indicative of a number of program storage locations remaining to be processed before said predetermined instruction is reached.

* * * * *